United States Patent [19]
Josephson

[11] Patent Number: 5,689,579
[45] Date of Patent: Nov. 18, 1997

[54] RULE-BASED CIRCUIT, METHOD AND SYSTEM FOR PERFORMING ITEM LEVEL RECONCILIATION

[75] Inventor: Stanley M. Josephson, Dallas, Tex.

[73] Assignee: J.D. Carreker and Associates, Inc., Dallas, Tex.

[21] Appl. No.: 587,936

[22] Filed: Jan. 17, 1996

[51] Int. Cl.⁶ .................................................... G06K 9/00
[52] U.S. Cl. ............................ 382/137; 395/245; 902/38
[58] Field of Search .................................. 382/137, 138, 382/139, 140, 309; 395/230, 239, 245; 902/38, 40; 235/379

[56] References Cited

U.S. PATENT DOCUMENTS

| | | | |
|---|---|---|---|
| 4,264,808 | 4/1981 | Owens et al. | 235/379 |
| 4,270,042 | 5/1981 | Case | 235/379 |
| 4,523,330 | 6/1985 | Cain | 382/7 |
| 4,694,397 | 9/1987 | Grant et al. | 364/408 |
| 4,823,264 | 4/1989 | Deming | 364/408 |
| 4,948,174 | 8/1990 | Thomson et al. | 283/58 |
| 4,974,878 | 12/1990 | Josephson | 283/67 |
| 5,038,283 | 8/1991 | Caveney | 364/403 |
| 5,040,226 | 8/1991 | Elischer et al. | 382/7 |
| 5,121,945 | 6/1992 | Thomson et al. | 283/58 |
| 5,224,173 | 6/1993 | Kuhns et al. | 382/2 |
| 5,237,159 | 8/1993 | Stephens et al. | 235/379 |
| 5,265,007 | 11/1993 | Barnhard, Jr. et al. | 364/408 |
| 5,373,550 | 12/1994 | Campbell et al. | 379/100 |
| 5,412,190 | 5/1995 | Josephson et al. | 235/379 |
| 5,488,671 | 1/1996 | Kern | 382/138 |
| 5,532,464 | 7/1996 | Josephson et al. | 235/379 |

FOREIGN PATENT DOCUMENTS

| | | | |
|---|---|---|---|
| 57-164368 | 10/1982 | Japan | 364/408 |
| 57-187762 | 11/1982 | Japan | 235/379 |

OTHER PUBLICATIONS

"V Series Item Processing System Tape Input/Ouput Module", UNISYS brochure, 5 pages, (no date).
Sales literature describing product by "StarChek" dated Feb. 17, 1995 entitled Star Check—Advance Notification System, 6 pages.
Sales literature entitled "Star Systems, Inc.—Overview" by StarChek, 12 pages (no date).
Sales literature describing StarChek Advance Notification System dated Jul. 30, 1993, 4 pages.
Literature dated Sep. 6, 1993 entitled ". . . While Low Cost Alternative Gets Test Run with Eight Banks," 1 page.
Article dated Friday, May 26, 1995, from the "American Banker" entitled Star System Sets Up Firm to Market Data Base for Thwarting Check Fraud, by Beth Piskora, 1 page.
Article dated Jul. 1993 from "Checks & Checking" entitled California Banks Leading Assault on Check Fraud, pp. 2.

*Primary Examiner*—Andrew Johns
*Attorney, Agent, or Firm*—Hitt Chwang & Gaines, P.C.

[57] ABSTRACT

A reconciling circuit for, and method of, reconciling a first database with a second database, the first database containing first item data arranged in records and fields, the second database containing second item data arranged in records and fields. The reconciling circuit includes: (1) a matching circuit for comparing the records of the first database with the records of the second database, the matching circuit placing a designation on mismatching ones of the records of the first and second databases, (2) at least one field mismatch tolerance rule indicating, by field, an allowed extent of mismatch and (3) a mismatch tolerance circuit for applying the at least one field mismatch tolerance rule to the fields of the mismatching ones, the mismatch tolerance circuit removing the designation when the fields of the mismatching ones fall within the mismatch tolerance rules.

30 Claims, 3 Drawing Sheets

RULE-BASED CIRCUIT, METHOD AND SYSTEM FOR PERFORMING ITEM LEVEL RECONCILIATION

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

CROSS-REFERENCE TO RELATED APPLICATION

This application is a related to application Ser. No. 08/023,364, filed on Feb. 26, 1993, for an "Electronic Check Presentment System Having a Return Item Notification System Incorporated Therein," now U.S. Pat. No. 5,412,190, a continuation-in-part of original application Ser. No. 07/731,529, filed on Jul. 17, 1991, for an "Electronic Check Presentment System," now U.S. Pat. No. 5,237,159.

REFERENCE TO MICROFICHE APPENDIX

A microfiche appendix containing a computer program listing was submitted with Ser. No. 07/731,529 and is incorporated herein by reference for all purposes.

TECHNICAL FIELD OF THE INVENTION

The present invention is directed, in general, to the field of electronic check processing and, more specifically, to a rule-based circuit, method of operation and system for performing item level reconciliation for use with electronic check processing systems and data processing apparatus.

BACKGROUND OF THE INVENTION

Conventionally, financial institutions ("FIs"), such as banks, have handled the transfer and presentment of negotiable instruments, such as checks and drafts, for payment in a manual, paper-based fashion. At specified times each day, "sending" FIs sorted all negotiable instruments presented to them by depositors and other correspondent FIs into bundles. Each of the bundles contains the negotiable instruments for the particular FIs on which they are drawn (e.g., "drawee" or "paying" FI).

The sorted bundles of negotiable instruments were then typically segregated into batches of negotiable instruments according to an assigned American Banking Association ("ABA") routing/transit number ("R/T") printed on the face of the negotiable instrument. One or more of these batches were then aggregated for shipment to the paying FI. A detailed listing and a cover letter, commonly collectively referred to as a "cash letter," were attached to each such shipment of negotiable instruments. The cash letters presented the dollar amount of all negotiable instruments within the batch and summarized its accumulated dollar amount. This summary information often included the names of the paying and sending FIs, the preassigned R/T associated with each of the same, the number of negotiable instruments in the batch and the total dollar amount of all of the negotiable instruments in the batch.

When the paying FI received the cash letter, it verified its contents (i.e., negotiable instrument amounts balanced with the totals contained on the cover letter), a process commonly referred to as "reconciliation." If a balancing discrepancy existed (e.g., missing or extra negotiable instrument, amount or arithmetic error, etc.), the condition was documented and notification of the error was slated for the sending bank. Other conventional check processing and posting functions, commonly referred to as "Demand Deposit Accounting" ("DDA"), were then performed to determine whether any of the accounts on which the negotiable instruments were drawn were restricted (e.g., closed, dormant, stop payment, account holder deceased, etc.). If a particular account was not restricted, the paying FI determined whether there was enough money in the account (i.e., sufficient funds) to cover payment of a negotiable instrument drawn thereon.

The paying FI, in response to these determinations, either accepted or rejected payment of the negotiable instrument, slating the reconciled negotiable instrument for return. The paying FI notified the sending FI of any balancing discrepancies, any negotiable instruments to be returned unpaid, or the like. The return to the sending FI was again accomplished by physical transportation of the negotiable instruments.

It became readily apparent as negotiable instrument volume, and in particular check volume, increased, that conventional negotiable instrument processing methods required automation. To facilitate this automation, the ABA introduced a method of printing information on each negotiable instrument, commonly referred to as Magnetic Ink Character Recognition ("MICR"). The MICR method, which today uses a font known as "E13B," is used to properly route and process each received negotiable instrument. The contents of the MICR line are specified in various American National Standards Institute ("ANSI") publications. The most recent standard being ANSIx9.13 (1990). Typically, there are six MICR fields defined: (1) dollar amount, (2) account number, (3) R/T number, (4) process control or serial number, (5) auxiliary on-us or serial number, and (6) external process code. The dollar amount, R/T number and external process code are fixed as to length and content. The other fields are variable and allow each FI the widest possible latitude in designing the fields to meet their specific requirements.

The incorporation of MICR information on each negotiable instrument significantly improved the clearing process in terms of speed and flexibility. The cash letter process was automated, while the reconciliation process remained manual.

Automation introduced additional types of reconciliation discrepancies which were largely due to: (1) differences in processing equipment and software used by the various FIs, (2) a lack of quality control standards for MICR printing, and (3) exceptions caused by environmental conditions. To address some of these problems, and to further speed the clearing process, processing systems and, later, processing system networks were integrated therein. More particularly, extracted MICR information on the negotiable instruments is used to create electronic payment transactions that are sent via data transmission means from sending FIs to paying FIs.

Today, the electronic clearing process includes electronic check presentment ("ECP"), electronic data exchange ("EDE"), automated clearing houses ("ACH"), branch item capture ("BIC") and check truncation. Each of these exemplary electronic sub-processes rely on the ability for one or more FIs to extract MICR information or data from the negotiable instrument, convert the data to an electronic transaction, apply the electronic transaction to an account for debiting purposes and subsequently match the paper negotiable instrument to the electronic transaction for reconciliation purposes.

The types of processing systems and related equipment employed in an FI's electronic clearing process typically vary in functionality. For example, the circuitry used to read the information contained within a given MICR line varies with the type of equipment and the techniques used to recognize the magnetic and/or optical representation of the individual MICR symbols and numbers. To convert the paper negotiable instrument MICR information to an electronic item, the MICR information is typically scanned and formatted to conform to one of several standard electronic transaction formats. The electronic item is then grouped with other electronic items, similar to the cash letter process described hereinabove, and transmitted via data transmission means, possibly through intermediary FIs, such as Federal Reserve Banks ("FRBs"), to a paying FI. The paper negotiable instrument follows thereafter, usually traversing each of the same FIs through which the electronic item passed. Each FI matches the received paper negotiable instrument with the previously processed electronic transaction for reconciliation. Reconciliation verifies that the electronic item was received, that there was a corresponding paper negotiable instrument and that the MICR contents of the paper negotiable instrument were correctly extracted and processed.

The matching process is often unduly complicated by factors such as variability in the placement of the contents of the MICR line information from FI to FI, the condition and quality of the paper instrument (e.g., torn, folded, dog-eared, etc.), the condition of the scanning equipment from FI to FI, etc. In point of fact, the paper instrument and the corresponding electronic item often include the same information, but due to variability caused by one or more of the foregoing factors, the paper instrument is incorrectly identified as a mismatch causing the electronic item to be incorrectly processed. This introduces an unnecessary, and often significant, latency into the check clearing process. Conventional procedures for matching an electronic item with a corresponding paper instrument fail to rationalize the contents of the MICR line as scanned by each FI. These procedures also fail to provide an accurate method of comparing and determining match criteria of a negotiable instrument's MICR line as read and captured by one FI's equipment and subsequently read and captured by another FI's equipment.

Accordingly, what is needed in the art is a system and method for reducing the amount of labor intensive, manual processes needed to perform reconciliation of electronically generated financial transactions with their corresponding paper transactions.

There exists a further need in the art for a system and method for measuring the criticality of certain fields within a negotiable instrument's MICR line, and the MICR line fields themselves, for determining the quality of the captured data from a negotiable instrument's MICR line, for assigning variable confidence level factors to the results of the paper instrument and electronic item comparison, and for determining the overall accuracy of the physical to the electronic match.

SUMMARY OF THE INVENTION

To address the above-discussed deficiencies of the prior art, it is an object of the present invention to provide a system and a method for reducing the amount of labor intensive, manual processes needed to perform reconciliation of electronically generated financial transactions. It is a further object of the present invention to provide systems and methods for measuring the criticality of certain fields within a check's MICR line, as well as the MICR line fields themselves, for determining the quality of the captured dam from a negotiable instrument's MICR line, for assigning variable confidence level factors to the results of the physical, or paper, negotiable instrument and electronic item comparison, and for determining the overall accuracy of the physical to electronic match.

In the attainment of the above-identified objects, the present invention provides a reconciling circuit, and method of operation, in electronic processing of negotiable instrument's, for reconciling a first database with a second database, the first database containing first item data arranged in records and fields, the second database containing second item data arranged in records and fields. The reconciling circuit includes: (1) a matching circuit for comparing the records of the first database with the records of the second database, the matching circuit placing a designation on mismatching ones of the records of the first and second databases, (2) at least one field mismatch tolerance rule indicating, by field, an allowed extent of mismatch and (3) a mismatch tolerance circuit for applying the at least one field mismatch tolerance rule to the fields of the mismatching ones of the records of the first and second databases, the mismatch tolerance circuit removing the designation when the fields of the mismatching ones of the records of the first and second databases fall within the mismatch tolerance rules.

In an alternate embodiment of the present invention, the first database is a database of predetermined presentment information relating to negotiable instruments sent from a presenting FI to a receiving FI and the second database is a database of information captured from the same negotiable instruments at the receiving FI.

In an alternate embodiment of the present invention, the fields include predefined fields of a MICR line printed on a negotiable instrument.

In an alternate embodiment of the present invention, each of the records corresponds to a single negotiable instrument sent from a presenting FI to a receiving FI.

In an alternate embodiment of the present invention, each of the records corresponds to a bundle of negotiable instruments sent from a presenting FI to a receiving FI.

In an alternate embodiment of the present invention, the at least one field mismatch tolerance rule is at least one of a rule concerning: (1) an allowed number of character deviations in the fields, (2) an allowed substitution of characters in the fields, and (3) a pattern, or sequence, of adjoining records of the first and second databases.

In an alternate embodiment of the present invention, the at least one field mismatch tolerance rule adapts over time as a function of the first and second item data.

In an alternate embodiment of the present invention, the second database is a database of information captured from negotiable instruments at a receiving FI by a MICR reader, the mismatch tolerance circuit is employable to diagnose a faulty operation of the MICR reader.

An advantageous embodiment for using or distributing the present invention is as software. The software embodiment includes a plurality of processing instructions which, along with the first and second databases and the at least one field mismatch tolerance rule, are stored to a suitable conventional memory or other equivalent storage medium. The instructions are readable and executable by one or more processing systems having one or more processing circuits. The instructions, upon execution, direct the processing circuitry to perform negotiable instrument by negotiable instrument reconciliation for use with electronic processing in accordance with the present invention. Exemplary memory and storage media include without limitation magnetic, optical, and semiconductor, as well as suitably arranged combinations thereof. An advantageous source code embodiment is attached hereto as APPENDIX A, and is incorporated herein by reference for all purposes.

An exemplary network in accordance with the principles of the present invention is operative to reconcile a first database with a second database. The network includes at least a presenting FI processing system and a receiving FI processing system, and the first and second databases contain first and second item data arranged in records and fields, respectively. The network further includes a matching circuit, at least one mismatch tolerance rule, and a mismatch tolerance circuit. The matching circuit is operative to compare the records of the first and second databases, and to place a designation on mismatching ones of the records of the first and second databases. The one or more field mismatch tolerance rules indicates, by field, an allowed extent of mismatch. The mismatch tolerance circuit, which is associated with the matching circuit, is operative to apply the one or more field mismatch tolerance rules to the fields of the mismatching ones of the records. The mismatch tolerance circuit, in response thereto, is operative to remove the designation when the fields of the mismatching ones of the records fall within the mismatch tolerance rules.

The foregoing has outlined rather broadly the features and technical advantages of the present invention so that those skilled in the art may better understand the detailed description of the invention set forth hereinbelow. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which like numbers designate like parts, and in which.

DETAILED DESCRIPTION

Preferred circuits, systems and methods for performing various aspects of a preferred electronic check clearing process for use and in accordance with the present invention are disclosed in U.S. Pat. No. 5,237,159, entitled "Electronic Check Presentment System," issued Aug. 17, 1993; and U.S. Pat. No. 5,412,190, entitled "Electronic Check Presentment System Having a Return Item Notification System Incorporated Therein," issued May 2, 1995; and in U.S. Pat. No. 5,532,464, entitled "Electronic Check Presentment System Having a Return Item Notification System Incorporated Therein;" U.S. patent application Ser. No. 08/236,632, entitled "Improved Electronic Check Presentment System Having a Non-ECP Exceptions Notification System Incorporated Therein;" U.S. patent application Ser. No. 08/535,739, entitled "System and Method for Providing Electronic Advance Notification of Closed for Cause Financial Institution Accounts;" U.S. patent application Ser. No. 08/489,227, entitled "System and Method for Providing Advance Notification of Potential Presentation Returns Due to Account Restrictions." Each of the above-identified patent documents is commonly owned with the present invention and is incorporated herein by reference for all purposes.

Figure 1:
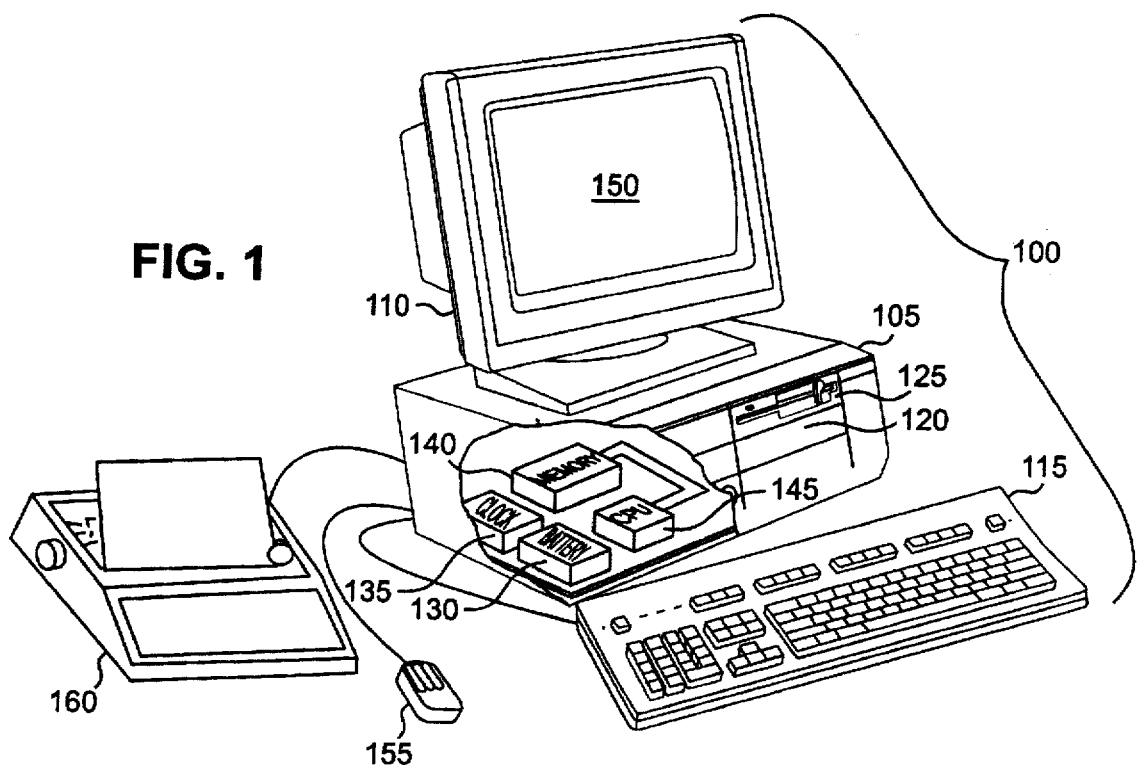
FIG. 1 illustrates an isometric view of an exemplary processing system that provides a suitable environment within which the present invention may be implemented and operated.

Turning initially to FIG. 1, illustrated is an isometric view of an exemplary processing system (generally designated 100). Processing system 100 is capable of being programmed in accordance with the principles of the present invention. Exemplary processing system 100 includes a housing 105, a display device 110 and a keyboard 115. "Include," as the term is used herein, means inclusive without limitation. Housing 105 includes a hard disk drive 120 and a floppy disk drive 125. Hard disk drive 120 is suitable to provide fast access storage and retrieval. Floppy disk drive 125 is suitable to receive, read or write to external disks, and may suitably be replaced by or combined with other conventional structures for transferring data or instructions, including tape and compact disc drives, telephony systems and devices (including telephone, video phone, facsimile or the like), network communication ports or the like. "Or," as the term is used herein, is inclusive, meaning and/or.

Housing 105 is partially cut-away to illustrate a battery 130, a clock 135, a detached local memory 140 and processing circuitry 145, all of which are suitably housed therein. Detached local memory 140 is operative to store data and tasks. A "task," as the term is used herein, means a set of instructions, in either source code or object code, which upon execution instruct or direct processing system 100 to perform a set of procedures or functions that may suitably involve collection of data, processing, or presentation of results. Processing circuitry 145, which is associated with detached local memory 140, is operative to execute selected ones of the stored tasks. "Associated with," as the term is used herein, means included within, interconnected with, contains, contained within, connected to, coupled to or with, communicable with, juxtaposes, cooperates with, interleaves, or the like.

In an advantageous embodiment, display device 110 is operative to provide a display area 150 that is accessible to executed ones of the plurality of tasks. Display area 150 is capable of displaying a graphical user interface in accordance with the principles of the present invention.

Further coupled through individual conventional connectors on housing 105 are a mouse 155 and a printer 160. Exemplary peripheral devices 110, 115, 155 and 160, which are all associated with processing circuitry 145, allow processing system 100 to interact with a user. Exemplary peripheral devices 110, 115, 155 and 160 may suitably be replaced by or combined with other user interfaces, including voice recognition systems, scanners and the like. "Scanners," as the term is used herein, means any suitably arranged device providing a means by which text, images, bar codes or other indicia may be read or perceived. Text and bar code scanners (e.g., MICR readers, sheet-fed scanners, hand-held scanners, etc.) typically recognize printed fonts, bar codes, hand-writing and the like, and convert the same into a digital code. Graphics scanners, in contrast, typically convert printed images into video images, such as raster graphics, for example, without recognizing the actual content of the text or pictures scanned.

Although processing system 100 is illustrated having single processing circuitry, a single hard disk drive and a single local memory, processing system 100 may suitably be equipped with any multitude or combination of processing circuitry or storage devices. Processing system 100 may, in point of fact, be replaced by, or combined with, any suitable processing system operative in accordance with the principles of the present invention, including sophisticated calculators, and hand-held, laptop/notebook, mini, mainframe and super computers, as well as processing system network combinations of the same.

Conventional processing system architecture is more fully discussed in *Computer Organization and Architecture*, by William Stalling, Macmillian Publishing Co. (3rd ed. 1993); conventional processing system network design is more fully discussed in *Data Network Design*, by Darren L. Spohn, McGraw-Hill, Inc. (1993); and conventional data communications is more fully discussed in *Data Communications Principles*, by R. D. Gitlin, J. F. Hayes and S. B. Weinstein, Plenum Press (1992) and in *The Irwin Handbook of Telecommunications*, by James Harry Green, Irwin Professional Publishing (2nd ed. 1992). Each of the foregoing publications is incorporated herein by reference.

Figure 2:
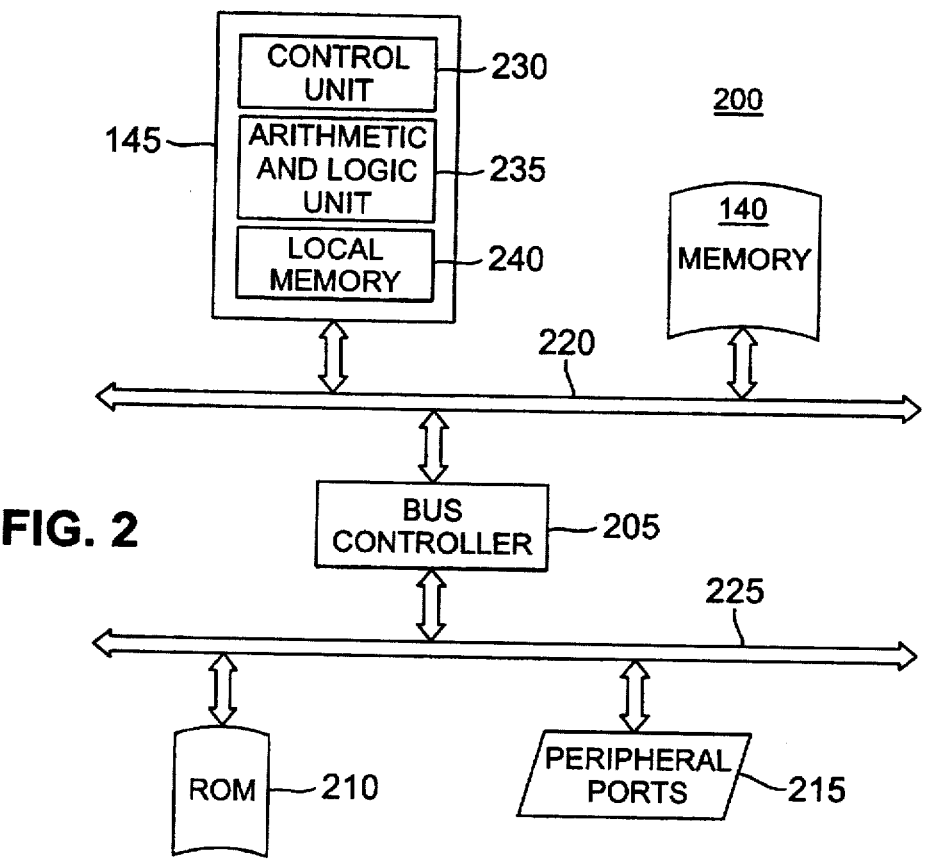
FIG. 2 illustrates a block diagram of an exemplary microprocessing circuit that may suitably be associated with the exemplary processing system of FIG. 1, and that provides a suitable environment within which the present invention may be implemented and operated.

Turning to FIG. 2, illustrated is a block diagram of an exemplary microprocessing circuit (generally designated 200) that may suitably be associated with processing system 100 of FIG. 1. Microprocessing circuit 200 includes detached local memory 140, processing circuitry 145, bus controller circuitry 205, a conventional read-only memory ("ROM") 210 and a set of peripheral ports 215. A host bus 220 is shown and is suitably operative to associate processing circuitry 145, detached local memory 140 and bus controller circuitry 205. In accordance with the illustrated embodiment, detached local memory 140 may suitably include random access memory ("RAM"), and processing circuitry 145 may suitably include one or more processors acting in concert.

An input/output ("I/O") bus 225 is shown and is operative to associate bus controller circuitry 205, ROM 210 and the set of peripheral ports 215. The set of peripheral ports 215 couple I/O bus 225 to peripheral devices 110, 115, 155, and 160 of FIG. 1 for communication therewith. Included among the set of peripheral ports 215 is a parallel port. Bus controller circuitry 205 provides suitable means by which host bus 220 and I/O bus 225 may be associated, thereby providing a path and management for communication therebetween. In accordance with the illustrated embodiment, host bus 220 is relatively fast to facilitate rapid communication between processing circuitry 145 and detached local memory 140 and is typically burdened with as few components as possible to maximize its speed. I/O bus 225 is allowed to run at a slower pace with respect to host bus 220 because its speed is less critical. Each of the lines of conventional buses 220, 225 require a drive current to carry signals thereon. The illustrated embodiment therefore operates in conjunction with a conventional system controller (not shown) that supplies the required drive current. Of course, the present invention may also suitably function within an architecture that only has a single bus or, alternatively, more than two buses.

In accordance with the present embodiment, detached local memory 140 is operative to store data or tasks, which processing circuitry 145 is operative to retrieve and execute. Processing circuitry 145 includes a control unit 230, an arithmetic and logic unit ("ALU") 235, and a internal memory 240 (e.g., stackable cache, a plurality of registers, etc.). Control unit 230 is suitably operative to fetch ones of the instructions from memory 140. ALU 235 is suitably operative to perform a plurality of operations, such as addition and Boolean AND, needed to carry out those instructions. Internal memory 240 is suitably operative to provide local high speed storage used to store temporary results and control information.

In an advantageous embodiment, processing system 100 is located at a receiving or an intermediary financial institution ("FI"). Hard disk drive 120 and detached local memory 140 are suitably arranged to cooperatively store first and second databases, a control task and at least one field mismatch tolerance rule. The first and second databases respectively contain first and second item data arranged in records and fields. The first database is a database of predetermined presentment information, such as extracted MICR information, relating to negotiable instruments transmitted, such as electronic checks, from a presenting FI to the receiving or intermediary FI. The second database is a database of information captured from one or more physical or paper negotiable instruments, such as corresponding MICR information, at the receiving FI.

The control task, upon execution, directs processing circuitry 145 to control electronic check processing in accordance with the present invention and, more particularly, to reconcile the first item data of the first database with the second item data of the second database. Processing circuitry 145 compares the records of the first database with the records of the second database and, in response thereto, places a designation on mismatching ones of the records of at least one of the first or second databases. Processing circuitry 145 then applies at least one of the one or more field mismatch tolerance rules to the fields of the mismatching ones of the records. The one or more field mismatch tolerance rules indicating, by field, an allowed extent of mismatch. If the fields of the mismatching ones of the records compare favorably with the one or more applied mismatch tolerance rules, then processing circuitry 145 removes the above-identified mismatch designation from the mismatching ones of the records.

In an exemplary embodiment, the allowed extent of mismatch associated with ones of the field mismatch tolerance rules define or represent points separating conditions that produce a given effect from conditions of a higher or lower degree that will not produce the effect. For example, at least one of the one or more field mismatch tolerance rules may suitably represent at least one of: (1) a rule concerning an allowed number of character deviations in the fields, (2) a rule concerning an allowed substitution of characters in the fields, and (3) a rule concerning a pattern of adjoining records of the first and second databases. In a related exemplary embodiment, the control task further directs processing circuitry 145 to adapt or modify at least one of the one or more field mismatch tolerance rules over time as a function of the first and second item data. The adaption or modification may, for example, be in response to a sensitive scanner or other equipment problem within the transmission path.

An important aspect of the present invention is that ones of the field mismatch tolerance rules may be based upon, derived from, or established upon any suitably applied mathematical theory, including statistics, stochastic modeling, chaos theory, standard deviation, probability theory, permutations and combinations, frequency, or the like.

In alternate preferred embodiments, the above-identified microprocessing circuit 200, in whole or in part, may be replaced by or combined with any other suitable processing circuits, including programmable logic devices, such as programmable array logic ("PALs") and programmable logic arrays ("PLAs"), digital signal processors ("DSPs"), field programmable gate arrays ("FPGAs"), application specific integrated circuits ("ASICs"), very large scale integrated circuits ("VLSIs") or the like. Those of ordinary skill in the art should realize that processing system 100 described hereinabove is co-operable with the processes, files, tasks and databases and various other machines, such as MICR readers, to be described more particularly hereinbelow, to form the various types of circuitry described and claimed herein.

Figure 3:
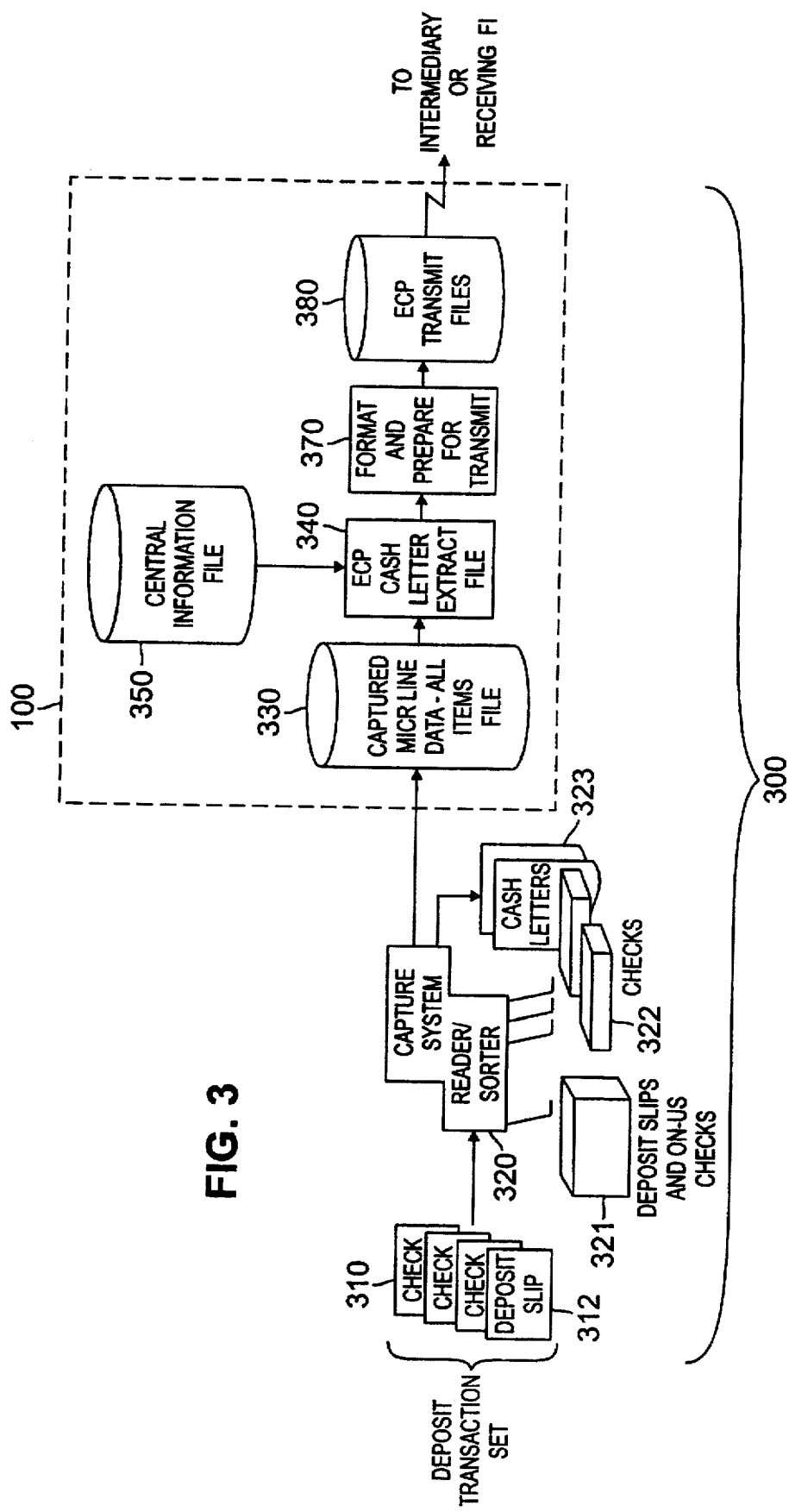
FIG. 3 illustrates a schematic block representation of an exemplary MICR capture and processing process, performed at a sending FI, in which captured item data generates an extract cash letter file for electronic transmission to an intermediary or receiving FI.

Turning to FIG. 3, illustrated is a schematic block representation of an exemplary MICR capture and processing process (generally designated 300), illustratively performed at a sending FI, in which captured negotiable instruments, such as paper checks, and deposit slips are processed. Exemplary conventional software and hardware for performing the foregoing include IBM 3890 reader/sorters and IBM Check Processing Control System ("CPCS"), Unisys DP 1800 reader/sorters and Unisys Item Processing System ("IPS"), or the like. These processes create both paper cash letters and electronic cash letters. The electronic cash letters are grouped into ECP files which are transmitted through data transmission means to either an intermediary, such as a FRB, an ECH, a data center or to the receiving or paying FI. The actual paper cash letters are physically transported, typically through each of the intermediaries, if any, which the ECP file passed, to the receiving FI.

More particularly, during the course of daily operations of an FI, such as a commercial bank, deposited negotiable instruments 310 are received from a variety of sources and transactions (e.g., over-the-counter, drive-in depositories, automated teller machines ("ATMs"), mail or lockboxes, etc.). Deposited negotiable instruments 310 are accompanied by a deposit slip 312 that reflects the depositor's FI account number and the sum of the dollar amounts of the accompanying negotiable instruments. Many of deposited negotiable instruments 310 are drawn on other FIs, but may also include checks drawn on the depositor's FI. The latter items are commonly referred to as "on-us" deposited checks.

In conventional data capture systems, negotiable instruments and deposit slips are preconditioned for processing and are read through scanner/reader/sorter machines 320 (including, optical or other mechanical or electrical data capturing systems or machines, etc.), collectively commonly referred to within the broader term "data capture circuitry," with groups of deposit slips and negotiable instruments being processed in transaction sets. During the data capture process, the deposit portion of the transaction set is first read and validated and information contained on the MICR line is extracted and stored in a database.

The physical documents may suitably be microfilmed, have a unique item sequence number ("ISN") assigned, or be directed to a designated pocket of the reader/sorter as either "on us," for those items drawn on the FI performing the capture and sorting operations, or as "transit," for those items drawn on all other FIs. Transit negotiable instruments 322 are directed, or segregated, to multiple pockets corresponding to the specific FIs on which the negotiable instruments are drawn (i.e., the paying FI), to correspondents of the paying FI or to specific Federal Reserve Districts or cities according to predefined tables commonly referred to as "sort patterns." The segregated negotiable instruments are then wrapped with a processing system generated detail list and cash letter covering report 323 for each group of negotiable instruments and the groups are dispatched via ground or air transportation to the other FIs for further processing.

The MICR code line information that has been extracted from the negotiable instrument is used to prepare electronic files for early data transmission to the other FIs, far in advance of the physical groups of negotiable instruments set forth above, which are to be dispatched at a later time. Thus, during the high speed capture process, a database may suitably be created on a host processing system that contains the data extracted from each item's MICR line. This database may suitably be referred to as an "all items file" 330. All items file 330 may advantageously contain ones of the following data for each item processed, namely, (1) from a deposit slip:
(a) depositor's account number; (b) deposit amount; (c) deposit process control; (d) deposit auxiliary on-us; (e) deposit item sequence number; and (f) deposit out-of-balance indicator; and (2) from a check:
(a) account number; (b) check amount; (c) check process control; (d) check auxiliary on-us or check number; (e) check item sequence number; (f) check R/T; (g) external process control code; and (h) eligibility/disposition code.

The illustrated embodiment may suitably employ all items file 330 as a database from which eligible detail items, corresponding to a physical negotiable instrument, are extracted in an extraction process 340 to provide an early determination of whether an item is drawn on an FI that is capable of receiving an ECP file. This determination may be made as a result of a comparison of the negotiable instrument's R/T to a file of eligible R/Ts contained on a central information file ("CIF") 350.

The extraction process 340 generates an extract file of items eligible for ECP processing that is formatted and prepared for transmission 370 to generate a transmission file 380. Transmission file 380 contains data from only those negotiable instruments eligible for further processing that has preferably been formatted into a suitable standard format. Transmission file 380 is transmitted via electronic means to an applicable receiving or intermediary FI.

Figure 4:
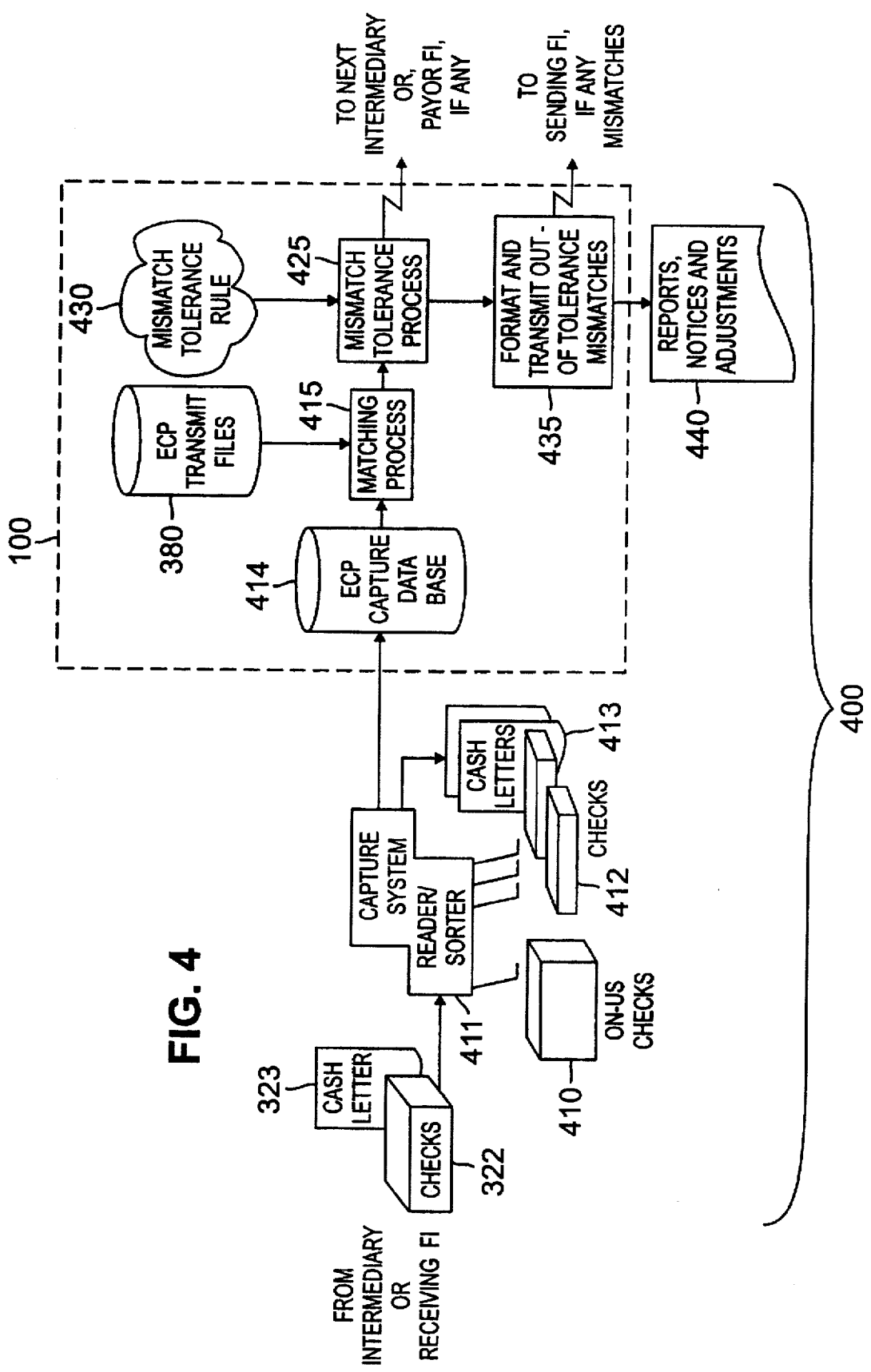
FIG. 4 illustrates a schematic block representation of an exemplary MICR capture and processing process, performed at the intermediary or receiving FI, in which captured item data is compared with the cash letter file created by the sending FI of FIG. 3, to determine MICR capture mismatches, the MICR capture mismatches are compared with one or more mismatch tolerance rules to determine whether the mismatches are within tolerance in accordance with the principles of the present invention.

Turning now to FIG. 4, illustrated is a schematic block representation of an exemplary MICR cash letter capture and processing process (generally designated 400), illustratively performed at the receiving FI where captured cash letter data related to previously transmitted ECP file 380 is compared to determine mismatches. The resulting mismatches, if any, are compared with one or more mismatch tolerance rules to determine whether the mismatches are within tolerance in accordance with the principles of the present invention.

Conventionally, transmission file 380 is used by a receiving FI to: (1) further segregate the electronic items contained therein to their final destination, typically determined by the R/T, or (2) accelerate the posting of a DDA account prior to a physical negotiable instrument corresponding to a particular electronic item being received.

After the ECP process has been completed at the receiving FI and suitably passed to a "next" FI, if any, the receiving FI receives a physical cash letter (i.e., the segregated checks 322 wrapped within the processing system generated detail list and cash letter 323) via ground or air transportation from the sending FI, such as that of FIG. 3. The set of checks 322 associated with cash letter 323, are preconditioned for processing, if necessary, and are read through a scanner/reader/sorter machines 410 (including, optical or other mechanical or electrical data capturing systems or machines, etc.), also collectively-commonly referred to within the broader term "data capture circuitry." During the data capture process 411, the negotiable instruments are again read and validated and information contained on the MICR line is extracted and stored into a captured item database 414. The physical documents may suitably be microfilmed, a unique item sequence number ("ISN") be assigned or the documents be directed to a designated pocket of the reader/sorter as either "on us" for those negotiable instruments drawn on the receiving FI or as "transit" for those negotiable instruments dram on all other FIs. If processing is performed by the receiving FI, all negotiable instruments are considered as "on-us."

The transit items may again be directed to multiple pockets corresponding to the specific FI on which a particular negotiable instrument was drawn (i.e., the paying FI), to a correspondent of the paying FI or to specific Federal Reserve Districts or cities according to sort patterns. The segregated negotiable instruments 412 are wrapped with a processing system generated detail list and cash letter covering report 413 for each group of negotiable instruments. The groups (i.e., cash letters) are dispatched via ground or air transportation to the other FIs for further processing.

Captured item database 414 preferably includes ones of the following fields for each negotiable instrument processed, namely, (a) account number; (b) check amount; (c) check process control; (d) check auxiliary on-us or check number; (e) check item sequence number; (f) check R/T; (g) external process control; and the like.

The receiving FI performs a matching process 415, whereby an electronic comparison is suitably made between ones of the records associated with extract file database 380 and ones of the records associated with captured item database 414. Techniques for performing matching between databases, files, records, fields, or the like are known. Extract file database 380 items that do not match corresponding items of captured item database 414 are suitably identified as "mismatched" by placing a designation on mismatching ones of the records, or in alternate embodiments on mismatching ones of the fields, of at least one of databases 380 and 414.

The receiving FI electronically performs a mismatch tolerance process 425, whereby a set of field mismatch tolerance rules (i.e., one or more) 430 is applied to the fields of the mismatching ones of the records of at least one of extract file database 380 and captured item database 414. The set of field mismatch tolerance rules 430 indicates, by file, record, field, or the like, various types of an allowed extent of mismatch of the mismatching ones of the records of databases 380 and 414. In an exemplary embodiment, the set of field mismatch tolerance rules may suitably include at least one of a rule concerning: (1) an allowed number of character deviations within the mismatching fields, (2) an allowed substitution of characters in the mismatching fields, (3) a pattern of adjoining records of extract file database 380 and captured item database 414. In alternate embodiments, ones of the set of mismatch tolerance rules may suitably be derived using any suitably applied mathematical theory, as has been set forth hereinabove.

More particularly, the source code embodiment attached hereto as APPENDIX A, and incorporated by reference hereinabove, provides a means by which the contents of the MICR line of an item received as extract fie database 380 and captured into captured item database 414 may suitably be rationalized. Upon execution, the code directs a processing system, such as processing system 100, to measure the criticality of certain characters, such as digits, within the item's MICR line, as well as the MICR line fields themselves, thereby determining the quality of the captured data, assigning variable confidence level factors to the results of the comparison and determining the overall accuracy of the physical negotiable instrument as compared to the electronic match.

For the purposes of discussion, it is assumed that a full MICR line match (i.e., no fields excluded), a full field reject repair, and a R/T single digit repair have all been performed. Each of these concepts are known. A confidence level factor is also suitably assigned to each field in the MICR line, preferably by processing system 100, such as:

TABLE 1

| FIELD | CONFIDENCE LEVEL |
| --- | --- |
| Dollar Amount | 8 |
| Account Number | 7 |
| Aux. on-us | 4 |
| R/T | 2 |
| Process Control | 0 |
| External Process Control | 0 |

Processing system 100 determines a count of the number of bad reads (e.g., characters or digits that were unreadable by the scanner, reader/sorter equipment) of each of the above-identified fields. In a preferred embodiment, the dollar amount and R/T fields may suitably be further subdivided, such as, (1a) Dollar Amount—Low order 5 digits, (1b) Dollar Amount—High order digits, (2a) R/T—Check digit, and (2b) Base R/T number. In accordance therewith, processing system 100 assigns a maximum number of unreadable digits (i.e., bad reads) allowed per field, such as:

TABLE 2

| FIELD | MAXIMUM BAD READS |
| --- | --- |
| Dollar Amount | |
| Low Order | 0 |
| High Order | 3 |
| Account Number | 2 |
| Aux. on-us | 2 |
| R/T | |
| Check Digit | 1 |
| Base R/T Number | 0 |
| Process Control/Serial Number | 0 |
| External Process Control | 1 |

If the number of bad reads in any field exceeds the allowable number, a current item remains a mismatch. In a related embodiment, if the current item is considered mismatched, but it is preceded or followed by a matched item, such as a negotiable instrument or group of matched negotiable instruments, the maximum allowable number of bad reads associated with the current item may suitably be increased for one or more of the fields.

Processing system 100 determines if the total number of bad reads per item, as weighted by the confidence level factor by field as set forth hereinabove, is greater than an associated limit. If the total number of weighted bad reads is greater than the associated limit, then the current item remains a mismatch. Again, however, if the current item is considered mismatched, but it is preceded or followed by a matched item, such as a negotiable instrument or group of matched negotiable instruments, the associated limit may suitably be increased, such as by a percentage factor.

Consider the following example wherein the associated limit per item is 46.

TABLE 3

| Field | Bad Read | Confidence | Results |
|---|---|---|---|
| Dollar Amount | | | |
|   Low order | 0 | 8 | 0 |
|   High order | 3 | 8 | 24 |
| Account Number | 2 | 7 | 14 |
| Aux. on-us | 2 | 4 | 8 |
| R/T | | | |
|   Check Digit | 0 | 2 | 0 |
|   Base R/T Number | 1 | 2 | 2 |
| Process Control/Serial Number | 2 | 0 | 0 |
| External Process Control | 1 | 0 | 0 |
| Total | 11 | 31 | 48 |

Since the total number of weighted bad reads (48) exceeds the associated limit (46), the current item associated with Table 3 remains a mismatch. Assume, however, that the items preceding or succeeding the current item associated with the values set forth in Table 3 were matched, a percentage factor may suitably be used to increase the associated limit above 46. Assuming a percentage factor of 10%, for example, a revised associated limit of 50.6 (i.e., 46+4.6) results in the current item qualifying as a match. In a related embodiment, missing or "blank" fields may suitably be assigned a maximum number of bad reads as a function of the field size, however, the Full Dollar Amount and/or the Full Account Number fields may not be missing. Use of percentage factors may be based on any suitable applied mathematical theory, it should be understood that the value of a given percentage factor may be application or situation dependant, and may suitably be adaptive over time. More generally, various ones of set of field mismatch tolerance rules 430 may suitably adapt over time as a function of extract file database 380 and captured item database 414. For example, the limit associated with an item may suitably be permanently set equal to the revised associated limit of 50.6, as calculated hereinabove. Further, in alternate embodiments, the set of mismatch tolerance rules 430, in whole or in part, may suitably include rules based upon any suitably applied mathematical theory.

Processing system 100, in response to application of the set of mismatch tolerance rules 430 to the fields of the mismatching ones of the records of extract file data base 380 and captured item databases 414, may suitably remove the mismatch designation when the fields of the mismatching ones of the records fall within the mismatch tolerance rules.

In an alternate preferred embodiment, processing system 100, as a function of mismatch tolerance process, may suitably use one of extract fie database 380 or captured item database 414, or the frequency of removal of mismatch designation, to diagnose an operation, or mis-operation, of the MICR reader, or other equipment, used during the capture process locally, or at a sending FI.

Upon completion of mismatch tolerance process 425, processing system 100 may traverse extract file database 380 or captured item database 414 to create a report of any mismatched items 435. The mismatched items are used to generate a report or other files 435 adapted to interface to other systems, such as of the sending FI, for example to generate an adjustment notification in the event of a large dollar mismatch. This report 440 may simply take the form of the mismatched items in a properly formatted file or another appropriate form, such as an interactive database or real-time alert. The report may be printed on paper or may be embodied in machine-readable form 440.

It should be understood that while the illustrated embodiment was presented with respect to a sending FI and at least one Intermediary or receiving FI, the principles of the present invention may suitably be implemented in connection with any single or plurality of FIs. From the above, it is apparent that the present invention provides a reconciling circuit for, and method of, reconciling a first database with a second database, the first database containing first item data arranged in records and fields, the second database containing second item data arranged in records and fields. The reconciling circuit includes: (1) a matching circuit for comparing the records of the first database with the records of the second database, the matching circuit placing a designation on mismatching ones of the records of the first and second databases, (2) at least one field mismatch tolerance rule indicating, by field, an allowed extent of mismatch and (3) a mismatch tolerance circuit for applying the at least one field mismatch tolerance rule to the fields of the mismatching ones, the mismatch tolerance circuit removing the designation when the fields of the mismatching ones fall within the mismatch tolerance rules. An important aspect of the present invention is the reduction of the amount of labor intensive, manual processes associated with conventional approaches for performing reconciliation of electronically generated financial transactions and to provide an automated means for generation and transmission of adjustment items as the result of the mismatch conditions.

The present invention is not limited to embodiment in a personal computer illustrated in accordance with FIGS. 1 and 2. The present invention may, in point of fact, suitably be more preferably embodied in computing equipment that has traditionally found more widely-accepted use in the banking industry, such as minicomputers, mainframe or super computers. The principles of operation of the present invention are, without regard to the class or type of associated processing system, fundamentally the same. The present invention may alternatively be implemented in firmware or in hardwired integrated circuits or discrete electronic components.

Although the present invention and its advantages have been described in detail, those skilled in the art should understand that they can make various changes, substitutions and alterations herein without departing from the spirit and scope of the invention in its broadest form.

APPENDIX A

```
****************************************************************
*  THIS PROGRAM CONTAINS PROPRIETARY AND TRADE SECRET
*  INFORMATION BELONGING TO J.D. CARREKER AND ASSOCIATES
*  INCORPORATED (JDCA). THE PROGRAM IS FURNISHED ONLY FOR
*  USE BY LICENSEES OF JDCA SOFTWARE PRODUCTS AND THEIR
*  DESIGNATED AGENTS OR EMPLOYEES RESPONSIBLE FOR INSTALLATION
*  OR OPERATION OF THE PRODUCTS. ANY OTHER USE, DUPLICATION,
*  OR DISSEMINATION WITHOUT THE WRITTEN CONSENT OF JDCA IS
*  NOT AUTHORIZED.
****************************************************************
*  CHKR5539 - AUTOMATED CASH LETTER CROSS REFERENCE
*
*  PURPOSE
*
*    THIS MODULE ASSIGNS PAPER CASH LETTERS TO THEIR
*    CORRESPONDING ELECTRONIC CASH LETTERS AUTOMATICALLY
*    ALLOWING THE USER TO AVOID THE ONLINE RECONCILIATION
*    PROCESS. THE MODULE WORKS FOR ECP AND RECO CASH LETTERS.
*    ONLY OVERALL CASH LETTER AMOUNTS AND COUNTS ARE COMPARED
*    WITHIN CIF VARIANCE LIMITS. SINCE NO DETAIL RECORDS ARE
*    COMPARED, THERE IS A CHANCE THAT THE WRONG CASH LETTERS
*    CAN BE CROSS REFERENCED. IN THIS CASE, THE ONLINE
*    SYSTEM IS USED TO REVERSE THE CROSS REFERENCES AND
*    MANUALLY TIE THE CASH LETTERS TOGETHER.
*    FOR 'ECP ONLY' CASH LETTERS THIS MODULE IS FOLLOWED
*    BY ECP BATCH RECONCILIATION MODULE (CHKR5540).
*    FOR 'RECO ONLY' CASH LETTERS THIS MODULE IS FOLLOWED
*    BY THE RECO CASH LETTER DETAIL MATCH MODULE (RCAN5540).
*    A CASH LETTER MAY ALSO QUALIFY FOR BOTH PROCESSES.
*    ANY RECO CASH LETTER THAT IS MATCHED WITHIN THE CIF
*    VARIANCE AMOUNT DOES NOT GO THRU RCA DETAIL PROCESSING,
*    IT IS ONLY REPORTED AS AN EXACT MATCH. IF THE CIF
*    VARIANCE AMOUNT IS ZERO, THEN ONLY CASH LETTERS WITH
*    EXACT AMOUNT MATCHES WILL BYPASS THE RCA DETAIL PROCESS.
*    THE RCA DETAIL MATCH PROCESS IS IN PROGRAM RCAN5540.
*
*  MATCH CRITERIA:
*
*    ALL MATCHING IS AT THE PARTNER LEVEL.
*
*    IF THE USER HAS MATCHED SOME OR ALL THE CASH LETTERS
*    WITH THE ONLINE SYSTEM, THEN THIS PROGRAM WILL REPORT
*    THOSE MATCHES. IT WILL ALSO TRY TO MATCH ANY LETTERS
*    NOT UPDATED BY THE USER. IT WILL NOT CHANGE ANYTHING
*    THE USER HAS UPDATED.
*
*    IF ONLY 1 ELECTRONIC LETTER AND 1 PAPER LETTER EXIST
*    FOR A PARTNER BANK THEY WILL BE MATCHED TOGETHER,
*    PROVIDED THE FIELD WS10-1TO1-MATCH-ALLOWED = 'Y'
*
```

```
*   IN CASES WHERE MULTIPLE CASH LETTERS EXIST
*   OR WHEN THE FIELD WS10-1TO1-MATCH-ALLOWED = 'N',
*   THE PROGRAM WILL TRY MATCHING INDIVIDUAL ELECTRONIC
*   LETTERS TO INDIVIDUAL PAPER LETTERS BY AMOUNT.
*   IF THE DIFFERENCE IN AMOUNTS IS WITHIN THE AMOUNT
*   VARIANCE FROM THE CIF SITE SCREEN THEN THESE LETTERS
*   ARE A MATCH.
*
*   AFTER THIS,
*   THE PROGRAM WILL TRY MATCHING INDIVIDUAL ELECTRONIC
*   LETTERS TO THE SUM OF ALL THE PAPER LETTERS BY AMOUNT
*   IF THE DIFFERENCE IN AMOUNTS IS WITHIN THE AMOUNT
*   VARIANCE FROM THE CIF SITE SCREEN ALL THE PAPER LETTERS
*   ARE TIED TO THE ELECTRONIC.
*
*   AFTER THIS,
*   THE PROGRAM WILL TRY MATCHING INDIVIDUAL ELECTRONIC
*   LETTERS TO INDIVIDUAL PAPER LETTERS BY ITEM COUNT.
*   IF THE PERCENT DIFFERENCE IN ITEM COUNTS IS WITHIN
*   THE ITEM COUNT VARIANCE FROM THE CIF SCREEN THEN THESE
*   ARE A MATCH.
*
*   AFTER THIS,
*   THE PROGRAM WILL TRY MATCHING INDIVIDUAL ELECTRONIC
*   LETTERS TO THE SUM OF ALL THE PAPER LETTERS BY ITEM COUNT
*   IF THE PERCENT DIFFERENCE IN ITEM COUNTS IS WITHIN
*   THE ITEM COUNT VARIANCE FROM THE CIF SCREEN ALL THE PAPER
*   LETTERS ARE TIED TO THE ELECTRONIC.
*
*   IN THE EVENT THE PROGRAM DOES NOT FIND A MATCH FOR ONE
*   OR MORE CASH LETTERS. IT COMPLETES WITH A RETURN CODE 0004.
*   THIS MAY BE OK DEPENDING ON THE SITUATION. RECONCILIATION
*   CAN BE RUN MULTIPLE TIMES, SO IT IS NOT ALWAYS NECESSARY
*   TO HAVE EVERYTHING LETTER TIED TOGETHER. THE 0004 IS JUST
*   A WARNING.
*
****************************************************************
    EJECT
ENVIRONMENT DIVISION. *
CONFIGURATION SECTION.
SOURCE-COMPUTER. IBM.
OBJECT-COMPUTER. IBM.

INPUT-OUTPUT SECTION.
FILE-CONTROL.

****************************************************************
*   INPUT FILES
****************************************************************
*
***  CHECKLINK INFORMATION FILE
*
```

```
    COPY CHKCS010.
*
*** CHECKLINK EXCEPTION FILE
*
    COPY CHKCS110.
*
*** RECEIVE EXCEPTION FILE
*
    COPY CHKRS110.
*
*** PARM FILE
*
    COPY CHKRS303.

*****************************************************************
*   OUTPUT FILES
*****************************************************************
*
*** CONTROL REPORT
*
    COPY JDCRPT1S.

*****************************************************************
*   I/O FILES
*****************************************************************
*
*** RECEIVE CONTROL FILE
*
    COPY CHKRS010.

EJECT
DATA DIVISION.
FILE SECTION.

*****************************************************************
*   INPUT FILES
*****************************************************************
*
*** CHECKLINK INFORMATION FILE
*
    COPY CHKCF010.
*
*** CHECKLINK EXCEPTION FILE
*
    COPY CHKCF110.
*
*** RECEIVE EXCEPTION FILE
```

```
*
    COPY CHKRF110.
*
*** PARM FILE
*
    COPY CHKRF303.

*****************************************************************
*   OUTPUT FILES
*****************************************************************
*
*** CONTROL REPORT
*                                           ()
    COPY JDCRPT1F.

*****************************************************************
*   I/O FILES
*****************************************************************
*
*** RECEIVE CONTROL FILE
*
    COPY CHKRF010.
                                            ()
    EJECT

*
*        WORKING STORAGE
*

WORKING-STORAGE SECTION.
01 WS00-PROGRAM-ID.
    05 WS00-PROG-NAME        PIC X(8)  VALUE 'CHKR5539'.
    05 FILLER                PIC X(1)  VALUE SPACE.    ()
    05 WS00-PROG-VERSION     PIC X(9)  VALUE 'VERS 2.1
    05 FILLER                PIC X(1)  VALUE SPACE.
    05 WS00-PROG-LEVEL       PIC X(6)  VALUE 'MOD 00'.
    05 FILLER                PIC X(1)  VALUE SPACE.

EJECT

*  SWITCHES

01 WS10-PROGRAM-SWITCHES.                              0
    05 FILLER               PIC X(8)  VALUE
    05 WS10-CHKR010-OPEN-SW  PIC X    VALUE 'N'.
    05 WS10-CHKR110-OPEN-SW  PIC X    VALUE 'N'.
    05 WS10-CHKC010-OPEN-SW  PIC X    VALUE 'N'.
    05 WS10-CHKC110-OPEN-SW  PIC X    VALUE 'N'.
    05 WS10-CHKS303-OPEN-SW  PIC X    VALUE 'N'.
    05 WS10-JDCRPT1-OPEN-SW  PIC X    VALUE 'N'.
    05 WS10-RCF-END          PIC X    VALUE 'N'.
```

-32-

```
    05 WS10-RCF-NEW-PARTNER      PIC X    VALUE 'N'.
    05 WS10-ALL-MATCHED          PIC X    VALUE 'Y'.    0
    05 WS10-1TO1-MATCH-ALLOWED   PIC X    VALUE 'Y'.
***    VALID VALUES
***       'Y' ALLOW 1 TO 1 MATCHES WHERE AMOUNT AND COUNT
***           ARE DISREGARDED. AMOUNT IS STILL USED TO
***           DETERMINE RCA STATUS.
***       'N' DON'T ALLOW 1 TO 1 MATCHES.
***           TO BE A MATCH THE CASH LETTER MUST BE WITHIN
***           ONE OF THE VARIANCE LIMITS, EITHER AMT OR CNT.
*
    EJECT                                          0

*  CROSS REFERENCE WORK AREAS.

01 WS20-XREF-WORK.
    05 FILLER                 PIC X(8)   VALUE
    05 WS20-AMOUNT-MATCH      PIC X.
    05 WS20-KEY.
       10 WS20-KEY-SITE-RTABA    PIC 9(8).
       10 WS20-KEY-PROCESS-DATE  PIC 9(6).
       10 WS20-KEY-PTNR-RTABA    PIC 9(8).          0
    05 WS20-ABSOLUTE-DIFFERENCE  PIC 9(11)V99 COMP-3 VALUE
    05 WS20-PERCENT              PIC 999V99   COMP-3 VALUE
    05 WS20-LOWEST-PERCENT       PIC 999V99   COMP-3 VALUE
    05 WS20-LOWEST-PERCENT-INDEX PIC 9(8)     COMP-3.
    05 WS20-MAX-ELEC-ENTRIES     PIC 99 COMP-3 VALUE 10.
    05 WS20-MAX-PAPER-ENTRIES    PIC 99 COMP-3 VALUE 10.
    05 WS20-NBR-OF-ELEC-ENTRIES  PIC 99 COMP-3 VALUE 0.
    05 WS20-NBR-OF-PAPER-ENTRIES PIC 99 COMP-3 VALUE 0.
    05 WS20-ONLINE-XREF          PIC X      VALUE 'N'.
    05 WS20-HOLD-START-KEY       PIC X(50)  VALUE SPACE.  0

05 WS20-ELEC-TABLE.
       10 WS20-ELEC-ENTRY   OCCURS 10 TIMES
                INDEXED BY WS20E1.
          15 WS20-ELEC-KEY.
             20 FILLER           PIC X(23).
             20 WS20-ELEC-CL-SEQ PIC 99.
             20 WS20-ELEC-CL-NBR PIC X(8).
          15 WS20-ELEC-BATCH-COUNT  PIC 9(6)   COMP-3.
          15 WS20-ELEC-ITEM-COUNT   PIC 9(6)   COMP-3.  00
          15 WS20-ELEC-ITEM-AMOUNT  PIC 9(11)V99 COMP-3.
          15 WS20-ELEC-RCA-OPT      PIC X.
***           * VALUES B=RCA AND ECP CASH LETTER
***           *        R=RCA ONLY CASH LETTER
***           *        E=ECP ONLY CASH LETTER
          15 WS20-ELEC-RCA-STATUS   PIC X.
***           * VALUES C=COMPLETED - NO DETAIL MATCH NEEDED
***           *        SPACE=PERFORM THE RCA DETAIL MATCH
          15 WS20-ELEC-MATCHED-ON   PIC X.
***           * VALUES 1=ONE TO ONE MATCH              0
```

-33-

```
***        *      O=MATCHED ONLINE
***        *      A=MATCHED ON AMOUNT
***        *      SPACE=MATCHED ON COUNT
***        *      SPACE=NOT MATCHED, WHEN THE FIELD
***        *         WS20-NBR-OF-ELEC-MATCHES IS ZERO.
        15 WS20-ELEC-ONLINE-XREF     PIC X.
***        * VALUES Y=ALREADY CROSS REFERENCED ONLINE
***        *        N=NO ONLINE CROSS REFERENCE MADE
        15 WS20-NBR-OF-ELEC-MATCHES  PIC 99    COMP-3.
        15 WS20-ELEC-MATCH-TABLE.              0
            20 WS20-ELEC-MATCHES   OCCURS 10 TIMES
                      INDEXED BY WS20EM1.
                25 WS20-ELEC-XREF-SEQ   PIC 99.
                25 WS20-ELEC-XREF-IND   PIC 9(8).

05 WS20-PAPER-TABLE.
        10 WS20-PAPER-ENTRY   OCCURS 10 TIMES
                  INDEXED BY WS20P1.
            15 WS20-PAPER-KEY.
                20 FILLER          PIC X(23).    0
                20 WS20-PAPER-CL-SEQ   PIC 99.
                20 WS20-PAPER-CL-NBR   PIC X(8).
            15 WS20-PAPER-BATCH-COUNT  PIC 9(6)   COMP-3.
            15 WS20-PAPER-ITEM-COUNT   PIC 9(6)   COMP-3.
            15 WS20-PAPER-ITEM-AMOUNT  PIC 9(11)V99 COMP-3.
            15 WS20-PAPER-ONLINE-XREF  PIC X.
***            * VALUES Y=ALREADY CROSS REFERENCED ONLINE
***            *        N=NO ONLINE CROSS REFERENCE MADE
            15 WS20-NBR-OF-PAPER-MATCHES PIC 99    COMP-3.
            15 WS20-PAPER-MATCH-TABLE.              0
                20 WS20-PAPER-MATCHES   OCCURS 10 TIMES
                          INDEXED BY WS20PM1.
                    25 WS20-PAPER-XREF-SEQ   PIC 99.
                    25 WS20-PAPER-XREF-IND   PIC 9(8).

*
*** THIS TABLE HOLDS THE NE, NP, HOLD, AND CANCELED
*** CASH LETTERS SO THEY CAN BE PRINTED WHEN A PARTNER
*** BREAK OCCURS OR AT EOF.
*                                  0
    05 WS20-LINE-TABLE-MAX     PIC 99   COMP-3 VALUE 30.
    05 WS20-LINE-TABLE.
        10 WS20-LINE-ENTRY   OCCURS 30 TIMES
                  INDEXED BY WS20L1.
            15 WS20-DTL-LINE  PIC X(132).

EJECT

*  WORK FIELDS
0
01 WS30-WORK-FIELDS.
    05 FILLER            PIC X(8)   VALUE
```

```
    05 WS30-LINES           PIC S9(3)  VALUE +0.
***    TELLS THE PRINT PARAGRAPH HOW MANY LINES TO SKIP
***    BEFORE PRINTING THE NEXT LINE. (0 = TOP OF PAGE)
*
    05 WS30-SAVE-REC        PIC X(132).
***    HOLD THE PRINT RECORD DURING TITLE PROCESSING.
*
    05 WS30-RETURN-CODE     PIC 9999.            0
***    HOLD THE RETURN CODE.
*
    05 WS30-SITE-ID         PIC 9(8).

05 WS30-CURR-DATE-N     PIC 9(6).
    05 WS30-CURR-DATE REDEFINES WS30-CURR-DATE-N.
        10 WS30-CURR-YEAR    PIC XX.
        10 WS30-CURR-MONTH   PIC XX.
        10 WS30-CURR-DAY     PIC XX.
    05 WS30-CURR-TIME.                           0
        10 WS30-CURR-TIME-HMS  PIC 9(6).
        10 FILLER            PIC XX.
    05 WS30-KEY-BREAKDOWN.
        10 FILLER            PIC X(23).
        10 WS30-KEY-CL-SEQ   PIC 99.
        10 WS30-KEY-CL-NBR   PIC X(8).

EJECT

*  PRINT LINES                             0

01 WS40-REPORT-LINES.
    05 FILLER               PIC X(8)   VALUE

05 WS40-TITLE-1.
        10 FILLER            PIC X(8)   VALUE 'REPORT:
        10 FILLER            PIC X(8)   VALUE
C21013  10 FILLER            PIC X(37)  VALUE SPACES.
        10 WS40-T1-BANK-NAME PIC X(26).
C21013  10 FILLER            PIC X(15)  VALUE SPACES.  00
        10 FILLER            PIC X(10)  VALUE
        'RUN DATE: '.
        10 WS40-T1-RUN-DATE   PIC X(8).
        10 FILLER            PIC X(14)  VALUE
        ' RUN TIME: '.
        10 WS40-T1-RUN-TIME   PIC X(5).

05 WS40-TITLE-2.
C21013  10 FILLER            PIC X(41)  VALUE SPACES.
        10 FILLER            PIC X(50)  VALUE     0
C21013           '  AUTOMATED CASH LETTER CROSS REFERENCE   '.
C21013  10 FILLER            PIC X(23)  VALUE SPACES.
        10 FILLER            PIC X(10)  VALUE
        'PAGE  : '.
```

-35-

```
    10 WS40-T2-PAGE-NBR      PIC Z(6)9.

05 WS40-TITLE-3.
    10 FILLER                PIC X(14)  VALUE
       'PROCESS DATE: '.
    10 WS40-T3-PROCESS-DATE  PIC X(8).

05 WS40-TITLE-4.
    10 FILLER                PIC X(14)  VALUE
       'PARTNER BANK: '.
    10 WS40-T4-PARTNER-RT    PIC X(8).
    10 FILLER                PIC X(3)   VALUE SPACES.
    10 WS40-T4-PARTNER-NAME  PIC X(26).

05 WS40-TITLE-5.
    10 FILLER                PIC X(21)  VALUE
       'CIF VARIANCE AMOUNT: '.
    10 WS40-T5-VAR-AMT       PIC $$$,$$$,$$9.99.
    10 FILLER                PIC X(7)   VALUE SPACES.
    10 FILLER                PIC X(23)  VALUE
       'CIF ITEM VARIANCE PCT: '.
    10 WS40-T5-VAR-PCT       PIC ZZ9.99.
    10 FILLER                PIC XX     VALUE
       ' %'.

05 WS40-DTL-TITLE-1.
    10 FILLER                PIC X(37)  VALUE
       '             ELECTRONIC              '.
    10 FILLER                PIC X(4)   VALUE
       '    '.
    10 FILLER                PIC X(37)  VALUE
       '               PAPER                 '.
    10 FILLER                PIC X(4)   VALUE
       '    '.
    10 FILLER                PIC X(49)  VALUE
       '                                                 '.

05 WS40-DTL-TITLE-2.
    10 FILLER                PIC X(37)  VALUE
       '------------ CASH LETTER ------------'.
    10 FILLER                PIC X(4)   VALUE
       '    '.
    10 FILLER                PIC X(37)  VALUE
       '------------ CASH LETTER ------------'.
    10 FILLER                PIC X(4)   VALUE
       '    '.
    10 FILLER                PIC X(49)  VALUE
       'LETTER    RCA       CROSS REFERENCE             '.

05 WS40-DTL-TITLE-3.
    10 FILLER                PIC X(37)  VALUE
       'SEQ  ID     COUNT         AMOUNT'.
```

```
        10 FILLER            PIC X(4)  VALUE
             ' '.
        10 FILLER            PIC X(37) VALUE
            'SEQ  ID    COUNT        AMOUNT'.              0
        10 FILLER            PIC X(4)  VALUE
             ' '.
        10 FILLER            PIC X(49) VALUE
            'TYPE    STATUS   RESULTS                  '.

05 WS40-DTL-LINE.
        10 WS40-DTL-E-SEQ    PIC 99.
        10 FILLER            PIC X.
        10 WS40-DTL-E-ID     PIC X(8).
        10 FILLER            PIC X.                        0
        10 WS40-DTL-E-CNT    PIC ZZZ,ZZ9.
        10 FILLER            PIC X.
        10 WS40-DTL-E-AMT    PIC ZZ,ZZZ,ZZZ,ZZZ.99.
        10 FILLER            PIC XXXX.
        10 WS40-DTL-P-SEQ    PIC 99.
        10 FILLER            PIC X.
        10 WS40-DTL-P-ID     PIC X(8).
        10 FILLER            PIC X.
        10 WS40-DTL-P-CNT    PIC ZZZ,ZZ9.
        10 FILLER            PIC X.                        0
        10 WS40-DTL-P-AMT    PIC ZZ,ZZZ,ZZZ,ZZZ.99.
        10 FILLER            PIC XXXX.
        10 WS40-DTL-CL-TYPE  PIC X(8).
        10 FILLER            PIC XX.
        10 WS40-DTL-RCA-STATUS  PIC X(8).
        10 FILLER            PIC XXXX.
        10 WS40-DTL-RESULTS  PIC X(27).

05 WS40-END-OF-REPORT.
        10 FILLER            PIC X(50) VALUE SPACES.       00
        10 FILLER            PIC X(27) VALUE
            '*** END OF REPORT ***'.

EJECT

*   COUNTERS AND ACCUMULATORS

01  WS90-PROGRAM-COUNTERS.
    05 FILLER               PIC X(8)  VALUE
    05 WS90-PAGE-COUNT      PIC S9(7) VALUE +0.            0
***    REPORT PAGE COUNTER
*
    05 WS90-LINE-COUNT      PIC S9(3) VALUE +900.
***    REPORT LINE COUNTER
*
    05 WS90-TOTAL-PAPER-COUNT   PIC 9(7)     COMP-3.
    05 WS90-TOTAL-PAPER-AMOUNT  PIC 9(12)V99 COMP-3.
```

-37-

```
        EJECT
0
*
*   COPYBOOKS
*

*
*** CHECKLINK INFORMATION FILE
*
01  FILLER            PIC X(8) VALUE 'CHKCR010'.
    COPY CHKCR010.
                                    0
*
*** CHECKLINK EXCEPTION FILE
*
01  FILLER            PIC X(8) VALUE 'CHKCR110'.
    COPY CHKCR110.

*
*** RECEIVE CONTROL FILE
*
01  FILLER            PIC X(8) VALUE 'CHKRR010'.  0
    COPY CHKRR010.

*
*** RECEIVE EXCEPTION FILE
*
01  FILLER            PIC X(8) VALUE 'CHKRR110'.
    COPY CHKRR110.

*
*** PARM FILE                       0
*
01  FILLER            PIC X(8) VALUE 'CHKRR303'.
    COPY CHKRR303.

*
*** GENERAL MESSAGE ROUTINE LINKAGE
*
01  FILLER            PIC X(8) VALUE 'CHKUL700'.
    COPY CHKUL700.
                                    0
*
*** BENEFIT SHARE ROUTINE LINKAGE
*
01  FILLER            PIC X(8) VALUE 'CHKUL720'.
    COPY CHKUL720.

*
*** GLOBAL WORKING STORAGE
*
01  FILLER            PIC X(8) VALUE 'CHKUW001'.  0
```

```
      COPY CHKUW001.

*
*** FILE NAMES AND DDNAMES
*
 01 FILLER               PIC X(8)  VALUE 'CHKUW003'.
    COPY CHKUW003.

*
*** RETURN CODES                              0
*
 01 FILLER               PIC X(8)  VALUE 'CHKUW004'.
    COPY CHKUW004.

*
*** GLOBAL VALUES AND LITERALS
*
 01 FILLER               PIC X(8)  VALUE 'CHKUW110'.
    COPY CHKUW110.
                                              0
*
*** DATE ROUTINE LINKAGE
*
 01 FILLER               PIC X(8)  VALUE 'JDCDATEL'.
    COPY JDCDATEL.

*
*** REPORT 1 - FORMATTER CONTROL REPORT
*
 01 FILLER               PIC X(8)  VALUE 'JDCRPT1R'.  00
    COPY JDCRPT1R.

*
*** FILE STATUS AND FILE ERROR MESSAGE
*
 01 FILLER               PIC X(8)  VALUE 'JDCSTATW'.
    COPY JDCSTATW.
C21013*
C21013*** JDCA TEXT CENTERING LOGIC - WORKING STORAGE COPYBOOK
C21013*
C21013 01 FILLER               PIC X(08) VALUE 'JDCCNTRW'.
C21013    COPY JDCCNTRW.
C21013

*        PROCEDURE  DIVISION            0

PROCEDURE DIVISION.

*  MAIN DRIVER PARAGRAPH.
```

```
A000-MAIN   SECTION.

DISPLAY 'CHKR5539 - BEGIN - '
            'AUTOMATED CASH LETTER CROSS-REFERENCE'.      0

ACCEPT WS30-CURR-DATE  FROM DATE.
    ACCEPT WS30-CURR-TIME  FROM TIME.

MOVE WS30-CURR-DATE         TO UW001-DATE-X.
    MOVE UW001-YEAR             TO UW001-FORMAT-YEAR.
    MOVE UW001-DAY              TO UW001-FORMAT-DAY.
    MOVE UW001-MONTH            TO UW001-FORMAT-MONTH.
    MOVE UW001-FORMAT-DATE      TO WS40-T1-RUN-DATE.
                                0
    MOVE WS30-CURR-TIME         TO UW001-TIME-X.
    MOVE UW001-TIME-HH          TO UW001-FORMAT-TIME-HH.
    MOVE UW001-TIME-MM          TO UW001-FORMAT-TIME-MM.
    MOVE UW001-TIME-SS          TO UW001-FORMAT-TIME-SS.
    MOVE UW001-FORMAT-TIME      TO WS40-T1-RUN-TIME.

MOVE ZEROES                 TO WS30-RETURN-CODE.
*
*** OPEN FILES
*                               0
    PERFORM A100-OPEN-FILES THRU A100-EXIT.

*
*** READ THE FIRST PARM RECORD
*
    PERFORM R000-SEQ-READ-PARM-FILE THRU R000-EXIT.

*
*** IF A PARM IS PRESENT, PROCESS IT AND LOOK FOR MORE PARMS
*                               0
    PERFORM B000-READ-PARMS THRU B000-EXIT
        UNTIL END-OF-FILE.

PERFORM B100-EDIT-PARMS THRU B100-EXIT.

*
*** LOAD THE RCF PAPER AND ELECTRONIC TABLES
*** FOR ONE PARTNER AT A TIME.
*
    MOVE LOW-VALUES             TO WS20-KEY.           0
    MOVE CR110-SITE-ID          TO WS20-KEY-SITE-RTABA.
    MOVE CR110-RCV-PROCESS-DATE-N TO WS20-KEY-PROCESS-DATE.

PERFORM C000-PROCESS THRU C000-EXIT
        UNTIL WS10-RCF-END = 'Y'.

GO TO X999-RETURN.
```

```
A000-EXIT. EXIT.
                                    0
   EJECT

*  OPEN FILES AND INIT WORK FIELDS.

A100-OPEN-FILES.

*
*** INITIALIZE FIELDS.
*
   MOVE 'OPEN'           TO UL700-F0001-FILE-ACTION.  0

*
*** OPEN PARM FILE
*
   MOVE 'INPUT'          TO UL700-F0001-FILE-ACCESS.
   MOVE UW003-CHKS303-DDNAME    TO UL700-F0001-FILE-DDNAME.

OPEN INPUT PARM-FILE.

IF NOT SUCCESSFUL                     0
      GO TO M000-OPEN-ERROR.

MOVE 'Y' TO WS10-CHKS303-OPEN-SW.

*
*** OPEN RCF
*
   MOVE 'I-O'            TO UL700-F0001-FILE-ACCESS.
   MOVE UW003-CHKR010-DDNAME    TO UL700-F0001-FILE-DDNAME.
                                    00
   OPEN I-O RECEIVE-CONTROL-FILE.

IF NOT SUCCESSFUL
      GO TO M000-OPEN-ERROR.

MOVE 'Y' TO WS10-CHKR010-OPEN-SW.

*
*** OPEN EXF
*                                    0
   MOVE 'INPUT'          TO UL700-F0001-FILE-ACCESS.
   MOVE UW003-CHKR110-DDNAME    TO UL700-F0001-FILE-DDNAME.

OPEN INPUT RECEIVE-EXCEPTION-FILE.

IF NOT SUCCESSFUL
      GO TO M000-OPEN-ERROR.

MOVE 'Y' TO WS10-CHKR110-OPEN-SW.
                                    0
```

-41-

```
*
*** OPEN CIF
*
    MOVE 'INPUT'              TO UL700-F0001-FILE-ACCESS.
    MOVE UW003-CHKC010-DDNAME    TO UL700-F0001-FILE-DDNAME.

OPEN INPUT CIF-FILE.

IF NOT SUCCESSFUL
       GO TO M000-OPEN-ERROR.                    0

MOVE 'Y' TO WS10-CHKC010-OPEN-SW.

*
*** OPEN CXF
*
    MOVE 'I-O'                TO UL700-F0001-FILE-ACCESS.
    MOVE UW003-CHKC110-DDNAME    TO UL700-F0001-FILE-DDNAME.

OPEN I-O CXF-FILE.                           0

IF NOT SUCCESSFUL
       GO TO M000-OPEN-ERROR.

MOVE 'Y' TO WS10-CHKC110-OPEN-SW.

*
*** OPEN REPORT 1 FILE
*
    MOVE 'OUTPUT'             TO UL700-F0001-FILE-ACCESS.  0
    MOVE UW003-JDCRPT1-DDNAME    TO UL700-F0001-FILE-DDNAME.

OPEN OUTPUT RPT1-FILE.

IF NOT SUCCESSFUL
       GO TO M000-OPEN-ERROR.

MOVE 'Y' TO WS10-JDCRPT1-OPEN-SW.

A100-EXIT.  EXIT.                                0

EJECT

*   CLOSE FILES

A200-CLOSE-FILES.

MOVE SPACES              TO UL700-LINKAGE-AREA.

MOVE 'CLOSE'             TO UL700-F0001-FILE-ACTION.  0
    MOVE 'INPUT'             TO UL700-F0001-FILE-ACCESS.
    MOVE UW003-CHKS303-DDNAME    TO UL700-F0001-FILE-DDNAME.
```

```
    IF WS10-CHKS303-OPEN-SW = 'Y'
      CLOSE PARM-FILE
      IF NOT SUCCESSFUL
        PERFORM M020-CLOSE-ERROR THRU M020-EXIT.

MOVE 'I-O'              TO UL700-F0001-FILE-ACCESS.
    MOVE UW003-CHKR010-DDNAME    TO UL700-F0001-FILE-DDNAME.

IF WS10-CHKR010-OPEN-SW = 'Y'
      CLOSE RECEIVE-CONTROL-FILE
      IF NOT SUCCESSFUL
        PERFORM M020-CLOSE-ERROR THRU M020-EXIT.

MOVE 'INPUT'            TO UL700-F0001-FILE-ACCESS.
    MOVE UW003-CHKR110-DDNAME    TO UL700-F0001-FILE-DDNAME.

IF WS10-CHKR110-OPEN-SW = 'Y'
      CLOSE RECEIVE-EXCEPTION-FILE
      IF NOT SUCCESSFUL
        PERFORM M020-CLOSE-ERROR THRU M020-EXIT.

MOVE 'INPUT'            TO UL700-F0001-FILE-ACCESS.
    MOVE UW003-CHKC010-DDNAME    TO UL700-F0001-FILE-DDNAME.

IF WS10-CHKC010-OPEN-SW = 'Y'
      CLOSE CIF-FILE
      IF NOT SUCCESSFUL
        PERFORM M020-CLOSE-ERROR THRU M020-EXIT.

MOVE 'INPUT'            TO UL700-F0001-FILE-ACCESS.
    MOVE UW003-CHKC110-DDNAME    TO UL700-F0001-FILE-DDNAME.

IF WS10-CHKC110-OPEN-SW = 'Y'
      CLOSE CXF-FILE
      IF NOT SUCCESSFUL
        PERFORM M020-CLOSE-ERROR THRU M020-EXIT.

MOVE 'OUTPUT'           TO UL700-F0001-FILE-ACCESS.
    MOVE UW003-JDCRPT1-DDNAME    TO UL700-F0001-FILE-DDNAME.

IF WS10-JDCRPT1-OPEN-SW = 'Y'
      CLOSE RPT1-FILE
      IF NOT SUCCESSFUL
        PERFORM M020-CLOSE-ERROR THRU M020-EXIT.

A200-EXIT. EXIT.

EJECT

*   READ PARM FILE
```

```
B000-READ-PARMS.

IF RR303-COMMENT
   OR
   RR303-BLANK-CARD
      GO TO B000-READ-NEXT.                         0

IF RR303-SITE-PRESENT
      NEXT SENTENCE
   ELSE
      MOVE UW004-2018     TO WS30-RETURN-CODE
      MOVE SPACES         TO UL700-LINKAGE-AREA
      MOVE 01             TO UL700-MSG-ID-COUNT
      MOVE 'E0060'        TO UL700-MSG-ID (1)
      PERFORM M900-CALL-MESSAGE-ROUTINE THRU M900-EXIT
      DISPLAY 'CHKR5539 - ' UL700-RTN-MSG (1)       0
      GO TO X999-RETURN.

IF RR303-SITE-PRESENT
      IF RR303-SITE-ID NOT NUMERIC
         MOVE UW004-2018     TO WS30-RETURN-CODE
         MOVE SPACES         TO UL700-LINKAGE-AREA
         MOVE 01             TO UL700-MSG-ID-COUNT
         MOVE 'E0167'        TO UL700-MSG-ID (1)
         PERFORM M900-CALL-MESSAGE-ROUTINE THRU M900-EXIT
         DISPLAY 'CHKR5539 - ' UL700-RTN-MSG (1)    0
         GO TO X999-RETURN.

IF RR303-SITE-PRESENT
      MOVE RR303-SITE-ID     TO WS30-SITE-ID.

B000-READ-NEXT.

PERFORM R000-SEQ-READ-PARM-FILE THRU R000-EXIT.

B000-EXIT. EXIT.                                    0

*  EDIT THE PARM FILE INPUT

B100-EDIT-PARMS.
*
*** SITE MUST BE ON CIF AND CXF
*
   MOVE WS30-SITE-ID     TO CR010-SITE-ID.
   MOVE ZEROES           TO CR010-BANK-ID.          0
   MOVE CR010-KEY        TO CIF-KEY.

PERFORM R200-RDM-READ-CIF THRU R200-EXIT.

IF NOT-FOUND
      MOVE UW004-2021    TO WS30-RETURN-CODE
```

```
          MOVE SPACES           TO UL700-LINKAGE-AREA
          MOVE 01               TO UL700-MSG-ID-COUNT
          MOVE 'E0172'          TO UL700-MSG-ID (1)
          PERFORM M900-CALL-MESSAGE-ROUTINE THRU M900-EXIT    0
          DISPLAY 'CHKR5539 - ' UL700-RTN-MSG (1)
          GO TO X999-RETURN.

MOVE WS30-SITE-ID        TO CR110-SITE-ID.
       MOVE CR110-KEY           TO CXF-KEY.

PERFORM R400-RDM-READ-CXF THRU R400-EXIT.

IF NOT-FOUND
  ***     *THE PREPROCESSOR MUST HAVE NOT BEEN RUN FOR THIS SITE.  0
  ***     *IT CREATES THE CXF RECORD.
          MOVE UW004-2021       TO WS30-RETURN-CODE
          MOVE SPACES           TO UL700-LINKAGE-AREA
          MOVE 01               TO UL700-MSG-ID-COUNT
          MOVE 'E0162'          TO UL700-MSG-ID (1)
          PERFORM M900-CALL-MESSAGE-ROUTINE THRU M900-EXIT
          DISPLAY 'CHKR5539 - ' UL700-RTN-MSG (1)
          GO TO X999-RETURN.

C21013    MOVE +26              TO CNTRW-LENGTH.
C21013    MOVE CR010-SITE-NAME  TO CNTRW-TEXT-AREA.
C21013    PERFORM CNTRP-TEXT-CENTER-RTN THRU CNTRP-EXIT.
C21013    MOVE CNTRW-TEXT-AREA  TO WS40-T1-BANK-NAME.

MOVE CR110-RCV-PROCESS-DATE  TO UW001-DATE-X.
       MOVE UW001-YEAR              TO UW001-FORMAT-YEAR.
       MOVE UW001-DAY               TO UW001-FORMAT-DAY.
       MOVE UW001-MONTH             TO UW001-FORMAT-MONTH.
       MOVE UW001-FORMAT-DATE       TO WS40-T3-PROCESS-DATE.

IF CR010-RCA-VAR-AMOUNT NOT NUMERIC
          MOVE ZEROES TO CR010-RCA-VAR-AMOUNT.
                                                     0
       IF CR010-RCA-ITEM-VAR-PCT NOT NUMERIC
          MOVE 5.0 TO CR010-RCA-ITEM-VAR-PCT.

B100-EXIT.  EXIT.

EJECT

*   MAIN PROCESSING PARAGRAPH

C000-PROCESS.                               0

*
   *** RESET THE TABLE FOR THE NEXT PARTNER BANK
   *
       MOVE ZEROES     TO WS20-NBR-OF-PAPER-ENTRIES
```

```
            WS20-NBR-OF-ELEC-ENTRIES.

MOVE SPACES    TO WS20-PAPER-TABLE
                     WS20-ELEC-TABLE.
                                              0
   MOVE HIGH-VALUES TO WS20-LINE-TABLE.
   SET WS20L1 TO 1.

PERFORM C010-RESET-MATCHES THRU C010-EXIT
      VARYING WS20E1 FROM 1 BY 1
      UNTIL WS20E1 > WS20-MAX-ELEC-ENTRIES.

PERFORM C020-RESET-PAPER-MATCHES THRU C020-EXIT
      VARYING WS20P1 FROM 1 BY 1
      UNTIL WS20P1 > WS20-MAX-PAPER-ENTRIES.         0

*
*** SET SEARCH INDEXES
*
   SET WS20E1  TO 1.
   SET WS20EM1 TO 1.
   SET WS20P1  TO 1.
   SET WS20PM1 TO 1.

IF WS10-RCF-NEW-PARTNER = 'Y'                     0
      PERFORM C210-READ-PARTNER-CIF THRU C210-EXIT.

MOVE 'N'        TO WS10-RCF-NEW-PARTNER.

*
*** GET THE NEXT (OR FIRST) PARTNER BANK'S RECORDS
*
   PERFORM C100-READ-PARTNER-RCFS THRU C100-EXIT
      UNTIL WS10-RCF-NEW-PARTNER = 'Y'
         OR WS10-RCF-END = 'Y'.                      0

*
*** NO RCF RECORDS FOR THE PARTNER
*
   IF WS20-NBR-OF-PAPER-ENTRIES = ZEROES
      AND
      WS20-NBR-OF-ELEC-ENTRIES = ZEROES
         GO TO C000-CONTINUE.

*                              0
*** CROSS REFERENCE THE ELEC AND PAPER LETTERS
*
   PERFORM D000-MATCHING-PROCESS THRU D000-EXIT.

*
*** REPORT ELECTRONIC TO PAPER MATCHES AND UPDATE RCFS.
*** REPORT ELECTRONIC LETTERS WITH NO MATCH
```

```
*
    PERFORM F000-RPT-AND-UPDT-ELEC THRU F000-EXIT
      VARYING WS20E1 FROM 1 BY 1                        0
      UNTIL WS20E1 > WS20-NBR-OF-ELEC-ENTRIES.
*
*** REPORT PAPER LETTERS WITH NO MATCH
*
    PERFORM F100-RPT-PAPER THRU F100-EXIT
      VARYING WS20P1 FROM 1 BY 1
      UNTIL WS20P1 > WS20-NBR-OF-PAPER-ENTRIES.

C000-CONTINUE.                                          0

PERFORM F500-RPT-LINES THRU F500-EXIT
      VARYING WS20L1 FROM 1 BY 1
      UNTIL WS20L1 > WS20-LINE-TABLE-MAX
        OR
        WS20-DTL-LINE (WS20L1) = HIGH-VALUES.

C000-EXIT.  EXIT.

C010-RESET-MATCHES.                                     000

IF WS20-NBR-OF-ELEC-MATCHES (WS20E1) NUMERIC
      AND
      WS20-NBR-OF-ELEC-MATCHES (WS20E1) > 0
        PERFORM C011-RESET-LOOP THRU C011-EXIT
          VARYING WS20EM1 FROM 1 BY 1
          UNTIL WS20EM1 > WS20-NBR-OF-ELEC-MATCHES (WS20E1).

MOVE ZEROES    TO WS20-NBR-OF-ELEC-MATCHES (WS20E1).
                                        0
    MOVE SPACES    TO WS20-ELEC-RCA-STATUS (WS20E1)
                      WS20-ELEC-MATCH-TABLE (WS20E1).

C010-EXIT.  EXIT.

C011-RESET-LOOP.

SET WS20P1 TO WS20-ELEC-XREF-IND (WS20E1, WS20EM1).

PERFORM C020-RESET-PAPER-MATCHES THRU C020-EXIT.    0

C011-EXIT.  EXIT.

C020-RESET-PAPER-MATCHES.

MOVE ZEROES    TO WS20-NBR-OF-PAPER-MATCHES (WS20P1).

MOVE SPACES    TO WS20-PAPER-MATCH-TABLE (WS20P1).
```

-47-

```
C020-EXIT. EXIT.                              0

EJECT

*   READ THE RCF FOR A NEW PARTNER

C100-READ-PARTNER-RCFS.

PERFORM R300-START-RCF THRU R300-EXIT.

IF NOT-FOUND                              0
       MOVE 'Y' TO WS10-RCF-END
       GO TO C100-EXIT
    ELSE
       PERFORM R310-SEQ-READ-RCF-RXF THRU R310-EXIT
       IF END-OF-FILE
          MOVE 'Y' TO WS10-RCF-END
          GO TO C100-EXIT.

PERFORM C200-LOAD-RCF-TABLES THRU C200-EXIT
      UNTIL WS10-RCF-NEW-PARTNER = 'Y'        0
         OR WS10-RCF-END = 'Y'.

C100-EXIT. EXIT.

*   LOAD THE RCF'S FOR THE PARTNER INTO THE PAPER AND ELECTRONIC
*   TABLES

C200-LOAD-RCF-TABLES.
                                              0
    IF RR010-KEY-DEST-SITE-RTABA NOT = WS20-KEY-SITE-RTABA
       MOVE 'Y'          TO WS10-RCF-END
       GO TO C200-EXIT.

*
*** IF THE CASH LETTER WAS ALREADY CROSS REFERENCED BY THE
*** USER THRU THE ONLINE SYSTEM, THEN JUST MOVE PAPER
*** SEQ NUMBERS TO THE ELECTRONIC ENTRY TABLE.
*
    IF WS20-ONLINE-XREF = 'Y'                 0
       AND
       RR010-CASH-LETTER
         SET WS20EM1 TO 1
         MOVE 'O' TO WS20-ELEC-MATCHED-ON (WS20E1)
         PERFORM C201-MOVE-XREFS THRU C201-EXIT
           VARYING RR010R1 FROM 1 BY 1
           UNTIL RR010R1 > 10.
*
*** IF THE CASH LETTER WAS ALREADY CROSS REFERENCED BY THE    0
*** USER THRU THE ONLINE SYSTEM, THEN JUST MOVE ELECTRONIC
```

-48-

```
*** SEQ NUMBER TO THE PAPER ENTRY TABLE.
*
   IF WS20-ONLINE-XREF = 'Y'
     AND
     RR010-PAPER-LETTER
        MOVE 1 TO WS20-NBR-OF-PAPER-MATCHES (WS20P1)
        MOVE RR010-RECON-TO-CL-SEQ
          TO WS20-PAPER-XREF-SEQ (WS20P1, 1).
                                     0
*
*** BUILD THE RCF TABLES
*
   IF RR010-CASH-LETTER
     MOVE RR010-KEY      TO WS20-ELEC-KEY (WS20E1)
     MOVE RR010-ACCUM-BATCH-COUNT
              TO WS20-ELEC-BATCH-COUNT (WS20E1)
     MOVE RR010-ACCUM-ITEM-COUNT
              TO WS20-ELEC-ITEM-COUNT (WS20E1)
     MOVE RR010-ACCUM-CHECK-AMOUNT                  00
              TO WS20-ELEC-ITEM-AMOUNT (WS20E1)
     MOVE RR010-RCA-OPTION TO WS20-ELEC-RCA-OPT (WS20E1)
     MOVE WS20-ONLINE-XREF TO WS20-ELEC-ONLINE-XREF (WS20E1)
     SET WS20-NBR-OF-ELEC-ENTRIES TO WS20E1
     SET WS20E1 UP BY 1
   ELSE
     MOVE RR010-KEY      TO WS20-PAPER-KEY (WS20P1)
     MOVE RR010-ACCUM-BATCH-COUNT
              TO WS20-PAPER-BATCH-COUNT (WS20P1)
     MOVE RR010-ACCUM-ITEM-COUNT                    0
              TO WS20-PAPER-ITEM-COUNT (WS20P1)
     MOVE RR010-ACCUM-CHECK-AMOUNT
              TO WS20-PAPER-ITEM-AMOUNT (WS20P1)
     MOVE WS20-ONLINE-XREF TO WS20-PAPER-ONLINE-XREF (WS20P1)
     SET WS20-NBR-OF-PAPER-ENTRIES TO WS20P1
     SET WS20P1 UP BY 1.

C200-READ-NEXT.

PERFORM R310-SEQ-READ-RCF-RXF THRU R310-EXIT        0

IF END-OF-FILE
     MOVE 'Y'       TO WS10-RCF-END
     GO TO C200-EXIT.

C200-EXIT. EXIT.

C201-MOVE-XREFS.

IF RR010-RECON-PAPER-SEQ (RR010R1) NOT NUMERIC      0
     OR
     RR010-RECON-PAPER-SEQ (RR010R1) = ZEROES
     GO TO C201-EXIT.
```

-49-

```
    IF WS20-NBR-OF-ELEC-MATCHES (WS20E1) NUMERIC
        ADD 1 TO WS20-NBR-OF-ELEC-MATCHES (WS20E1)
    ELSE
        MOVE 1 TO WS20-NBR-OF-ELEC-MATCHES (WS20E1).

MOVE RR010-RECON-PAPER-SEQ (RR010R1)
        TO WS20-ELEC-XREF-SEQ (WS20E1, WS20EM1).

SET WS20EM1 UP BY 1.

C201-EXIT. EXIT.

C210-READ-PARTNER-CIF.

*
*** INCREASE THE LINE COUNT SO THE NEXT RECORD PRINTED
*** WILL CAUSE A PAGE BREAK.
*
    MOVE 900           TO WS90-LINE-COUNT.

*
*** READ THE PARTNER CIF.
*
    MOVE CR110-SITE-ID      TO CR010-SITE-ID.
    MOVE WS20-KEY-PTNR-RTABA    TO CR010-BANK-ID.
    MOVE CR010-KEY          TO CIF-KEY.

PERFORM R200-RDM-READ-CIF THRU R200-EXIT.

IF NOT-FOUND
        MOVE SPACES         TO CR010-PARTNER-BANK-RECORD.

C210-EXIT. EXIT.

EJECT

*   CROSS REFERENCE THE PAPER AND ELECTRONIC LETTERS IN THE

D000-MATCHING-PROCESS.

*
*** NO CASH LETTERS PRESENT
*
    IF WS20-NBR-OF-ELEC-ENTRIES = ZERO
    AND
        WS20-NBR-OF-PAPER-ENTRIES = ZERO
        GO TO D000-EXIT.

*
*** NO ELECTRONIC CASH LETTERS PRESENT
*** GO REPORT THE PAPER LETTERS.
```

-50-

```
*
   IF WS20-NBR-OF-ELEC-ENTRIES = ZERO
      AND
      WS20-NBR-OF-PAPER-ENTRIES > ZERO
         GO TO D000-EXIT.                        0
*
*** NO PAPER CASH LETTERS PRESENT
*** GO REPORT THE ELECTRONIC LETTERS.
*
   IF WS20-NBR-OF-ELEC-ENTRIES > ZERO
      AND
      WS20-NBR-OF-PAPER-ENTRIES = ZERO
         GO TO D000-EXIT.
                                                 00
*
*** ONLY 1 PAPER CASH LETTER AND
*** 1 ELECTRONIC CASH LETTER ARE PRESENT
*** BUT PERCENT AND AMOUNT MUST BE USED
*** TO DETERMINE THE MATCH. 1 TO 1 MATCHES
*** ARE NOT PERMITTED.
*
   IF WS10-1TO1-MATCH-ALLOWED = 'N'
      AND
      WS20-NBR-OF-ELEC-ENTRIES = 1               0
      AND
      WS20-NBR-OF-PAPER-ENTRIES = 1
         PERFORM D200-MATCH-1ELEC THRU D200-EXIT
         GO TO D000-EXIT.

*
*** ONLY 1 PAPER CASH LETTER AND
*** 1 ELECTRONIC CASH LETTER ARE PRESENT
*** THIS IS CONSIDERED AN AUTOMATIC MATCH.
*** THE ONLY THING THAT MUST BE DETERMINED IS    0
*** WHETHER THE RCA STATUS IS SET TO COMPLETE
*** WHICH IS DETERMINED BY A MATCH WITHIN
*** THE AMOUNT VARIANCE.
*
   IF WS20-NBR-OF-ELEC-ENTRIES = 1
      AND
      WS20-NBR-OF-PAPER-ENTRIES = 1
         PERFORM D100-MATCH-1ELEC-1PAPER THRU D100-EXIT
         GO TO D000-EXIT.
                                                 0
*
*** ONLY 1 ELECTRONIC CASH LETTER IS PRESENT
*** BUT MORE THAN 1 PAPER CASH LETTER IS PRESENT
*
   IF WS20-NBR-OF-ELEC-ENTRIES = 1
      AND
      WS20-NBR-OF-PAPER-ENTRIES > 1
```

-51-

```
       PERFORM D200-MATCH-1ELEC THRU D200-EXIT
       GO TO D000-EXIT.
                                    0
*
*** MULTIPLE ELECTRONIC CASH LETTERS AND
*** MULTIPLE PAPER CASH LETTERS ARE PRESENT
*
    PERFORM D300-MATCH-ALL THRU D300-EXIT.

D000-EXIT. EXIT.

*  MATCH USED WHEN ONLY 1 ELECTRONIC CASH LETTER AND      0
*  1 PAPER CASH LETTER ARE PRESENT.

D100-MATCH-1ELEC-1PAPER.

*
*** NOTHING TO DO IF THEY WERE ALREADY MATCHED ONLINE.
*
   IF WS20-ELEC-ONLINE-XREF (1) = 'Y'
      GO TO D100-EXIT.
                                    0
*
*** WHEN THERE IS JUST 1 ELECTRONIC AND 1 PAPER, THEN
*** CROSS REFERENCE THE CASH LETTERS REGARDLESS OF AMOUNTS
*** OR ITEM COUNTS.
*
   MOVE WS20-ELEC-CL-SEQ (1)  TO WS20-PAPER-XREF-SEQ (1, 1).
   MOVE WS20-PAPER-CL-SEQ (1) TO WS20-ELEC-XREF-SEQ (1, 1).
   MOVE '1'         TO WS20-ELEC-MATCHED-ON (1).
   MOVE 1           TO WS20-NBR-OF-ELEC-MATCHES (1)
                       WS20-NBR-OF-PAPER-MATCHES (1)  0
                       WS20-ELEC-XREF-IND (1, 1)
                       WS20-PAPER-XREF-IND (1, 1).

*
*** FOR RECO CASH LETTERS, IF THE DIFFERENCE IN THE AMOUNTS
*** IS WITHIN THE CIF AMOUNT VARIANCE, THE RCA STATUS IS
*** SET TO COMPLETE.
*** THIS STATUS WILL PREVENT RCA DETAIL MATCHING ON THESE
*** CASH LETTERS IN THE NEXT RCA PROGRAM.
*                                   0
   IF WS20-ELEC-RCA-OPT (1) = 'E'
      GO TO D100-EXIT.

COMPUTE WS20-ABSOLUTE-DIFFERENCE =
         WS20-ELEC-ITEM-AMOUNT (1)
        - WS20-PAPER-ITEM-AMOUNT (1).

IF WS20-ABSOLUTE-DIFFERENCE NOT > CR010-RCA-VAR-AMOUNT
     MOVE 'C'          TO WS20-ELEC-RCA-STATUS (1).
```

-52-

```
                                    0
D100-EXIT. EXIT.

EJECT

*  MATCH USED WHEN ONLY 1 ELECTRONIC CASH LETTER AND
*  MORE THAN ONE PAPER CASH LETTER IS PRESENT.

D200-MATCH-1ELEC.

*                              (0)
*** NOTHING TO DO IF THEY WERE ALREADY MATCHED ONLINE.
*
   IF WS20-ELEC-ONLINE-XREF (1) = 'Y'
      GO TO D200-EXIT.

*
*** COMPARE THE ELECTRONIC LETTER TO EACH PAPER LETTER AMOUNT.
*
   SET WS20EM1 TO 1.
   SET WS20PM1 TO 1.                    0
   MOVE ZEROES TO WS90-TOTAL-PAPER-AMOUNT.

PERFORM D210-MATCH-1ELEC-AMT-LOOP THRU D210-EXIT
      VARYING WS20P1 FROM 1 BY 1
      UNTIL WS20P1 > WS20-NBR-OF-PAPER-ENTRIES.

*
*** ONLY ONE PAPER LETTER MATCHED THE ELECTRONIC.
*** GO REPORT THE MATCH AND THE LEFTOVER PAPER.
*                              0
   IF WS20-NBR-OF-ELEC-MATCHES (1) = 1
      MOVE 'A' TO WS20-ELEC-MATCHED-ON (1)
      GO TO D200-EXIT.

*
*** EITHER MORE THAN 1 MATCH WAS FOUND
*** OR NO MATCHES WERE FOUND ON THE AMOUNT.
*** SEE IF THE SUM OF ALL THE PAPER AMOUNTS MATCH THE
*** ELECTRONIC AMOUNT. IF SO, TIE EVERYTHING TOGETHER.
*                              0
   COMPUTE WS20-ABSOLUTE-DIFFERENCE =
         WS20-ELEC-ITEM-AMOUNT (1)
         - WS90-TOTAL-PAPER-AMOUNT.

IF WS20-ABSOLUTE-DIFFERENCE NOT > CR010-RCA-VAR-AMOUNT
      SET WS20EM1 TO 1
      SET WS20PM1 TO 1
      MOVE 'Y' TO WS20-AMOUNT-MATCH
      PERFORM D220-XREF-ALL-LETTERS THRU D220-EXIT
         VARYING WS20P1 FROM 1 BY 1        0
         UNTIL WS20P1 > WS20-NBR-OF-PAPER-ENTRIES
```

```
            MOVE 'A' TO WS20-ELEC-MATCHED-ON (1)
            GO TO D200-EXIT.

*
    *** RESET THE TABLE AND COMPARE THE ITEM COUNTS.
    *
        PERFORM C010-RESET-MATCHES THRU C010-EXIT
            VARYING WS20E1 FROM 1 BY 1
            UNTIL WS20E1 > WS20-MAX-ELEC-ENTRIES.              0

SET WS20EM1 TO 1.
        SET WS20PM1 TO 1.
        MOVE ZEROES TO WS90-TOTAL-PAPER-COUNT.

PERFORM D230-MATCH-1ELEC-CNT-LOOP THRU D230-EXIT
            VARYING WS20P1 FROM 1 BY 1
            UNTIL WS20P1 > WS20-NBR-OF-PAPER-ENTRIES.

*                                         0
    *** 1 PAPER LETTER MATCHED THE ELECTRONIC.
    *** GO REPORT THE MATCH AND THE LEFTOVER PAPER.
    *
        IF WS20-NBR-OF-ELEC-MATCHES (1) = 1
            GO TO D200-EXIT.

*
    *** MORE THAN ONE MATCH WAS FOUND ON THE ITEM COUNTS.
    *** BLANK OUT ALL MATCHES EXCEPT THE CLOSEST.
    *                                         0
        IF WS20-NBR-OF-ELEC-MATCHES (1) > 1
            SET WS20EM1 TO 1
            SET WS20PM1 TO 1
            PERFORM D240-FIND-CLOSEST-MATCH THRU D240-EXIT
                VARYING WS20P1 FROM 1 BY 1
                UNTIL WS20P1 > WS20-NBR-OF-PAPER-ENTRIES
            GO TO D200-EXIT.

*
    *** NO MATCHES WERE FOUND.                0
    *** SEE IF THE SUM OF ALL THE PAPER COUNTS MATCH THE
    *** ELECTRONIC COUNT. IF SO, TIE EVERYTHING TOGETHER.
    *
        SET WS20EM1 TO 1.
        SET WS20PM1 TO 1.

COMPUTE WS20-ABSOLUTE-DIFFERENCE =
            WS20-ELEC-ITEM-COUNT (1)
            - WS90-TOTAL-PAPER-COUNT.
                                              0
        IF WS20-ELEC-ITEM-COUNT (1) > WS90-TOTAL-PAPER-COUNT
            COMPUTE WS20-PERCENT ROUNDED =
                WS20-ABSOLUTE-DIFFERENCE
```

```
        / WS20-ELEC-ITEM-COUNT (1)
        * 100
ELSE
   COMPUTE WS20-PERCENT ROUNDED =
        WS20-ABSOLUTE-DIFFERENCE
        / WS90-TOTAL-PAPER-COUNT
        * 100.                              00

IF WS20-PERCENT NOT > CR010-RCA-ITEM-VAR-PCT
   MOVE 'N' TO WS20-AMOUNT-MATCH
   PERFORM D220-XREF-ALL-LETTERS THRU D220-EXIT
      VARYING WS20P1 FROM 1 BY 1
      UNTIL WS20P1 > WS20-NBR-OF-PAPER-ENTRIES.

D200-EXIT. EXIT.

0
*   FIND EACH PAPER THAT MATCHES THE ELECTRONIC ON
*   ITEM AMOUNT, WITHIN THE CIF AMOUNT VARIANCE.

D210-MATCH-1ELEC-AMT-LOOP.

COMPUTE WS20-ABSOLUTE-DIFFERENCE =
        WS20-ELEC-ITEM-AMOUNT (1)
        - WS20-PAPER-ITEM-AMOUNT (WS20P1).

ADD WS20-PAPER-ITEM-AMOUNT (WS20P1)            0
        TO WS90-TOTAL-PAPER-AMOUNT.

*
*** IF A MATCH IS FOUND, TIE THE PAPER TO THE ELECTRONIC.
*** FOR A RECO CASH LETTER FLAG THE RCA STATUS AS COMPLETE.
*** THIS STATUS WILL PREVENT RCA DETAIL MATCHING ON THESE
*** CASH LETTERS IN THE NEXT RCA PROGRAM.
*
   IF WS20-ABSOLUTE-DIFFERENCE NOT > CR010-RCA-VAR-AMOUNT
      MOVE WS20-ELEC-CL-SEQ (1)                   0
        TO WS20-PAPER-XREF-SEQ (WS20P1, WS20PM1)
      MOVE WS20-PAPER-CL-SEQ (WS20P1)
        TO WS20-ELEC-XREF-SEQ (1, WS20EM1)
      SET WS20-ELEC-XREF-IND (1, WS20EM1) TO WS20P1
      MOVE 1 TO WS20-PAPER-XREF-IND (WS20P1, WS20PM1)
      SET WS20-NBR-OF-ELEC-MATCHES (1)      TO WS20EM1
      SET WS20-NBR-OF-PAPER-MATCHES (WS20P1) TO WS20PM1
      SET WS20EM1 UP BY 1
      IF WS20-ELEC-RCA-OPT (1) NOT = 'E'
         MOVE 'C'   TO WS20-ELEC-RCA-STATUS (1).   0

D210-EXIT. EXIT.

*   THIS PARAGRAPH IS PERFORMED FOR ALL PAPER ITEMS.
```

* IT CROSS REFERENCES EACH ONE TO THE ELECTRONIC ITEM.

D220-XREF-ALL-LETTERS.

```
*                                           0
*** TIE A PAPER LETTER TO THE ELECTRONIC LETTER
*
    MOVE WS20-ELEC-CL-SEQ (1)
      TO WS20-PAPER-XREF-SEQ (WS20P1, WS20PM1).

MOVE WS20-PAPER-CL-SEQ (WS20P1)
      TO WS20-ELEC-XREF-SEQ (1, WS20EM1).

SET WS20-ELEC-XREF-IND (1, WS20EM1) TO WS20P1.
    MOVE 1 TO WS20-PAPER-XREF-IND (WS20P1, WS20PM1).         0
    SET WS20-NBR-OF-ELEC-MATCHES (1)     TO WS20EM1.
    SET WS20-NBR-OF-PAPER-MATCHES (WS20P1) TO WS20PM1.
    SET WS20EM1 UP BY 1.

*
*** DO NOT SET THE RCA STATUS TO COMPLETE UNLESS THE
*** MATCHES WERE MATCH WITHIN THE AMOUNT VARIANCE
*** AND THE ELECTRONIC LETTER IS A RECO TYPE.
*** ONCE THE RCA STATUS IS SET TO COMPLETE, NO DETAIL
*** MATCHING WILL OCCUR IN THE RCA DETAIL MATCH PROGRAM.     0
*
    IF WS20-AMOUNT-MATCH = 'Y'
       IF WS20-ELEC-RCA-OPT (1) NOT = 'E'
          MOVE 'C'  TO WS20-ELEC-RCA-STATUS (1).

D220-EXIT.  EXIT.

* COMPARE ITEM COUNTS OF EACH PAPER LETTER TO THE ELECTRONIC
0
D230-MATCH-1ELEC-CNT-LOOP.

*
*** FIND THE PERCENT OF DIFFERENCE BETWEEN THE ITEM COUNTS.
*
    COMPUTE WS20-ABSOLUTE-DIFFERENCE =
        WS20-ELEC-ITEM-COUNT (1)
        - WS20-PAPER-ITEM-COUNT (WS20P1).

IF WS20-ELEC-ITEM-COUNT (1) > WS20-PAPER-ITEM-COUNT (WS20P1)  0
       COMPUTE WS20-PERCENT ROUNDED =
           WS20-ABSOLUTE-DIFFERENCE
           / WS20-ELEC-ITEM-COUNT (1)
           * 100
    ELSE
       COMPUTE WS20-PERCENT ROUNDED =
           WS20-ABSOLUTE-DIFFERENCE
```

-56-

```
        / WS20-PAPER-ITEM-COUNT (WS20P1)
        * 100.
                                            00
    ADD WS20-PAPER-ITEM-COUNT (WS20P1)
      TO WS90-TOTAL-PAPER-COUNT.

*
*** SAVE THE INDEX OF THE CLOSEST PAPER CASH LETTER.
*** THIS WILL BE USED LATER IN CASE MULTIPLE MATCHES
*** ARE FOUND. THE CLOSEST MATCH WILL BE USED AND
*** THE OTHERS WILL BE REMOVED.
*
    IF WS20-PERCENT < WS20-LOWEST-PERCENT             0
       MOVE WS20-PERCENT TO WS20-LOWEST-PERCENT
       SET WS20-LOWEST-PERCENT-INDEX TO WS20P1.

*
*** IF A MATCH IS FOUND, TIE THE PAPER TO THE ELECTRONIC.
*
    IF WS20-PERCENT NOT > CR010-RCA-ITEM-VAR-PCT
       MOVE WS20-ELEC-CL-SEQ (1)
         TO WS20-PAPER-XREF-SEQ (WS20P1, WS20PM1)
       MOVE WS20-PAPER-CL-SEQ (WS20P1)              0
         TO WS20-ELEC-XREF-SEQ (1, WS20EM1)
       SET WS20-ELEC-XREF-IND (1, WS20EM1) TO WS20P1
       MOVE 1 TO WS20-PAPER-XREF-IND (WS20P1, WS20PM1)
       SET WS20-NBR-OF-ELEC-MATCHES (1)     TO WS20EM1
       SET WS20-NBR-OF-PAPER-MATCHES (WS20P1) TO WS20PM1
       SET WS20EM1 UP BY 1.

D230-EXIT. EXIT.

0
*  RESET ALL BUT THE CLOSEST ITEM COUNT MATCH.

D240-FIND-CLOSEST-MATCH.

IF WS20-LOWEST-PERCENT-INDEX NOT = WS20P1
       PERFORM C010-RESET-MATCHES THRU C010-EXIT.

D240-EXIT. EXIT.

EJECT                                  0

* MATCH USED WHEN MULTIPLE ELECTRONIC CASH LETTERS
* ARE PRESENT WITH ONE OR MORE PAPER LETTERS PRESENT.

D300-MATCH-ALL.

*
*** PROCESS EACH ELECTRONIC RECORD COMPARING AMOUNTS
*
```

-57-

```
    PERFORM D310-PROCESS-ELEC-AMTS THRU D310-EXIT              0
        VARYING WS20EI FROM 1 BY 1
        UNTIL WS20EI > WS20-NBR-OF-ELEC-ENTRIES.

*
*** BLANK OUT ALL BUT THE ONE TO ONE MATCHES.
*
    PERFORM D320-FIND-AMT-MATCHES THRU D320-EXIT
        VARYING WS20EI FROM 1 BY 1
        UNTIL WS20EI > WS20-NBR-OF-ELEC-ENTRIES.
                                                               0
*
*** IF SOME ELEC AND PAPER ITEMS ARE STILL NOT MATCHED,
*** MATCH THEM ON ITEM COUNTS.
*
    PERFORM D350-PROCESS-ELEC-CNTS THRU D350-EXIT
        VARYING WS20EI FROM 1 BY 1
        UNTIL WS20EI > WS20-NBR-OF-ELEC-ENTRIES.

*
*** BLANK OUT ALL BUT THE ONE TO ONE MATCHES.                  0
*
    PERFORM D360-FIND-CNT-MATCHES THRU D360-EXIT
        VARYING WS20EI FROM 1 BY 1
        UNTIL WS20EI > WS20-NBR-OF-ELEC-ENTRIES.

D300-EXIT.  EXIT.

*   COMPARE EACH ELECTRONIC AMOUNT WITH ALL THE PAPER LETTERS
0
D310-PROCESS-ELEC-AMTS.

*
*** BYPASS IF THE ELEC LETTER WAS MATCHED ONLINE.
*
    IF WS20-ELEC-ONLINE-XREF (WS20EI) = 'Y'
        GO TO D310-EXIT.

SET WS20EM1 TO 1.
    SET WS20PM1 TO 1.                                          0

*
*** COMPARE THE ELECTRONIC LETTER TO EACH PAPER LETTER AMOUNT.
*
    PERFORM D311-PROCESS-PAPER-AMTS THRU D311-EXIT
        VARYING WS20PI FROM 1 BY 1
        UNTIL WS20PI > WS20-NBR-OF-PAPER-ENTRIES.

D310-EXIT.  EXIT.
                                                               00
D311-PROCESS-PAPER-AMTS.
```

-58-

```
*
*** BYPASS IF THE PAPER LETTER WAS MATCHED ONLINE.
*
        IF WS20-PAPER-ONLINE-XREF (WS20P1) = 'Y'
C21020     GO TO D311-EXIT.

COMPUTE WS20-ABSOLUTE-DIFFERENCE =
            WS20-ELEC-ITEM-AMOUNT (WS20E1)              0
          - WS20-PAPER-ITEM-AMOUNT (WS20P1).

*
*** IF THE PAPER RECORD WAS MATCHED WITH THE PREVIOUS
*** ELECTRONIC ITEM THEM BUMP UP THE PAPER INDEX.
*
        IF WS20-ABSOLUTE-DIFFERENCE NOT > CR010-RCA-VAR-AMOUNT
          IF WS20-NBR-OF-PAPER-MATCHES (WS20P1) NOT = ZERO
            SET WS20PM1 TO WS20-NBR-OF-PAPER-MATCHES (WS20P1)
            SET WS20PM1 UP BY 1.                        0

*
*** IF A MATCH IS FOUND, TIE THE PAPER TO THE ELECTRONIC.
*** FOR A RECO CASH LETTER FLAG THE RCA STATUS AS COMPLETE.
*** THIS STATUS WILL PREVENT RCA DETAIL MATCHING ON THESE
*** CASH LETTERS IN THE NEXT RCA PROGRAM.
*
        IF WS20-ABSOLUTE-DIFFERENCE NOT > CR010-RCA-VAR-AMOUNT
            MOVE WS20-ELEC-CL-SEQ (WS20E1)
              TO WS20-PAPER-XREF-SEQ (WS20P1, WS20PM1)  0
            MOVE WS20-PAPER-CL-SEQ (WS20P1)
              TO WS20-ELEC-XREF-SEQ (WS20E1, WS20EM1)
            SET WS20-ELEC-XREF-IND (WS20E1, WS20EM1) TO WS20P1
            SET WS20-PAPER-XREF-IND (WS20P1, WS20PM1) TO WS20E1
            SET WS20-NBR-OF-ELEC-MATCHES (WS20E1) TO WS20EM1
            SET WS20-NBR-OF-PAPER-MATCHES (WS20P1) TO WS20PM1
            IF WS20-ELEC-RCA-OPT (1) = 'E'
              SET WS20EM1 UP BY 1
            ELSE
              MOVE 'C'  TO WS20-ELEC-RCA-STATUS (WS20E1)  0
              SET WS20EM1 UP BY 1.

D311-EXIT. EXIT.

*   BLANK OUT ALL THE AMOUNT MATCHES THAT ARE NOT 1 TO 1

D320-FIND-AMT-MATCHES.

*                                   0
*** BYPASS IF THE ELEC LETTER WAS MATCHED ONLINE.
*
        IF WS20-ELEC-ONLINE-XREF (WS20E1) = 'Y'
```

```
            GO TO D320-EXIT.

IF WS20-NBR-OF-ELEC-MATCHES (WS20E1) = 0
            GO TO D320-EXIT.

IF WS20-NBR-OF-ELEC-MATCHES (WS20E1) > 1
            PERFORM C010-RESET-MATCHES THRU C010-EXIT        0
            GO TO D320-EXIT.

IF WS20-NBR-OF-ELEC-MATCHES (WS20E1) = 1
C21020      SET WS20P1 TO WS20-ELEC-XREF-IND (WS20E1, 1)
C21020      IF WS20-NBR-OF-PAPER-MATCHES (WS20P1) = 1
C21020        NEXT SENTENCE
C21020      ELSE
C21020        PERFORM C010-RESET-MATCHES THRU C010-EXIT
C21020        GO TO D320-EXIT
C21020    ELSE
C21020      GO TO D320-EXIT.
                                   0
        MOVE 'A' TO WS20-ELEC-MATCHED-ON (WS20E1).

D320-EXIT. EXIT.

*  COMPARE EACH ELECTRONIC COUNT WITH ALL THE PAPER LETTERS

D350-PROCESS-ELEC-CNTS.

*                              0
    *** BYPASS IF THE ELEC LETTER WAS MATCHED ONLINE.
    *
        IF WS20-ELEC-ONLINE-XREF (WS20E1) = 'Y'
            GO TO D350-EXIT.

*
    *** BYPASS ANY LETTERS PREVIOUSLY MATCHED ON AMOUNT
    *
        IF WS20-NBR-OF-ELEC-MATCHES (WS20E1) > 0
            GO TO D350-EXIT.              0

SET WS20EM1 TO 1.
        SET WS20PM1 TO 1.

*
    *** COMPARE THE ELECTRONIC LETTER TO EACH PAPER LETTER AMOUNT.
    *
        PERFORM D351-PROCESS-PAPER-CNTS THRU D351-EXIT
            VARYING WS20P1 FROM 1 BY 1
            UNTIL WS20P1 > WS20-NBR-OF-PAPER-ENTRIES.        00

D350-EXIT. EXIT.
```

```
D351-PROCESS-PAPER-CNTS.

*
*** BYPASS IF THE PAPER LETTER WAS MATCHED ONLINE.
*
    IF WS20-PAPER-ONLINE-XREF (WS20P1) = 'Y'
       GO TO D351-EXIT.                              0

*
*** BYPASS ANY LETTERS PREVIOUSLY MATCHED ON AMOUNT
*
    IF WS20-NBR-OF-PAPER-MATCHES (WS20P1) NOT = 0
       GO TO D351-EXIT.

*
*** FIND THE PERCENT OF DIFFERENCE BETWEEN THE ITEM COUNTS.
*                                              0
    COMPUTE WS20-ABSOLUTE-DIFFERENCE =
        WS20-ELEC-ITEM-COUNT (WS20E1)
        - WS20-PAPER-ITEM-COUNT (WS20P1).

IF WS20-ELEC-ITEM-COUNT (WS20E1) >
       WS20-PAPER-ITEM-COUNT (WS20P1)
          COMPUTE WS20-PERCENT ROUNDED =
              WS20-ABSOLUTE-DIFFERENCE
              / WS20-ELEC-ITEM-COUNT (WS20E1)
              * 100                            0
    ELSE
          COMPUTE WS20-PERCENT ROUNDED =
              WS20-ABSOLUTE-DIFFERENCE
              / WS20-PAPER-ITEM-COUNT (WS20P1)
              * 100.

*
*** SAVE THE INDEX OF THE CLOSEST PAPER CASH LETTER.
*** THIS WILL BE USED LATER IN CASE MULTIPLE MATCHES
*** ARE FOUND. THE CLOSEST MATCH WILL BE USED AND        0
*** THE OTHERS WILL BE REMOVED.
*
    IF WS20-PERCENT < WS20-LOWEST-PERCENT
       MOVE WS20-PERCENT TO WS20-LOWEST-PERCENT
       SET WS20-LOWEST-PERCENT-INDEX TO WS20P1.

*
*** IF A MATCH IS FOUND, TIE THE PAPER TO THE ELECTRONIC.
*
    IF WS20-PERCENT NOT > CR010-RCA-ITEM-VAR-PCT         0
       MOVE WS20-ELEC-CL-SEQ (WS20E1)
         TO WS20-PAPER-XREF-SEQ (WS20P1, WS20PM1)
       MOVE WS20-PAPER-CL-SEQ (WS20P1)
         TO WS20-ELEC-XREF-SEQ (WS20E1, WS20EM1)
       SET WS20-ELEC-XREF-IND (WS20E1, WS20EM1) TO WS20P1
```

```
        SET WS20-PAPER-XREF-IND (WS20P1, WS20PM1) TO WS20E1
        SET WS20-NBR-OF-ELEC-MATCHES (WS20E1) TO WS20EM1
        SET WS20-NBR-OF-PAPER-MATCHES (WS20P1) TO WS20PM1
        SET WS20EM1 UP BY 1.
                                            0
   D351-EXIT. EXIT.

*  BLANK OUT ALL THE COUNT MATCHES THAT ARE NOT 1 TO 1

D360-FIND-CNT-MATCHES.

*
*** BYPASS IF THE ELEC LETTER WAS MATCHED ONLINE.
*                           0
       IF WS20-ELEC-ONLINE-XREF (WS20E1) = 'Y'
          GO TO D360-EXIT.

IF WS20-ELEC-MATCHED-ON (WS20E1) = 'A'
          GO TO D360-EXIT.

IF WS20-NBR-OF-ELEC-MATCHES (WS20E1) > 1
          PERFORM C010-RESET-MATCHES THRU C010-EXIT
          GO TO D360-EXIT.
                                            0
       IF WS20-NBR-OF-ELEC-MATCHES (WS20E1) = 1
C21020     SET WS20P1 TO WS20-ELEC-XREF-IND (WS20E1, 1)
          IF WS20-NBR-OF-PAPER-MATCHES (WS20P1) NOT = 1
             PERFORM C010-RESET-MATCHES THRU C010-EXIT.

D360-EXIT. EXIT.

EJECT

*   ANY RCF RECORD THAT HAS BEEN CROSS REFERENCED MUST BE    0
*   UPDATED ON THE FILE. REPORT ALL CROSS REFERENCED CASH
*   LETTERS AND ALL CASH LETTERS LEFT WITHOUT A MATCH.

F000-RPT-AND-UPDT-ELEC.

IF WS20-ELEC-ONLINE-XREF (WS20E1) = 'Y'
          PERFORM F050-MATCHED-ONLINE THRU F050-EXIT
          GO TO F000-EXIT.

IF WS20-NBR-OF-ELEC-MATCHES (WS20E1) = ZERO         00
          PERFORM F020-REPORT-NO-PAPER THRU F020-EXIT
          GO TO F000-EXIT.

PERFORM F010-SCAN-MATCHES THRU F010-EXIT
          VARYING WS20EM1 FROM 1 BY 1
          UNTIL WS20EM1 > WS20-NBR-OF-ELEC-MATCHES (WS20E1).
```

```
        PERFORM G100-UPDATE-ELEC-RCF THRU G100-EXIT.

F000-EXIT. EXIT.                            0

F010-SCAN-MATCHES.

SET WS20PI TO WS20-ELEC-XREF-IND (WS20EI, WS20EMI).

PERFORM F030-REPORT-MATCH THRU F030-EXIT.

PERFORM G000-UPDATE-PAPER-RCF THRU G000-EXIT.

F010-EXIT. EXIT.                            0

F020-REPORT-NO-PAPER.

MOVE SPACES              TO WS40-DTL-LINE.

MOVE WS20-ELEC-CL-SEQ (WS20EI)    TO WS40-DTL-E-SEQ.
        MOVE WS20-ELEC-CL-NBR (WS20EI)    TO WS40-DTL-E-ID.
        MOVE WS20-ELEC-ITEM-COUNT (WS20EI) TO WS40-DTL-E-CNT.
        MOVE WS20-ELEC-ITEM-AMOUNT (WS20EI) TO WS40-DTL-E-AMT.
                                  0
        IF WS20-ELEC-RCA-OPT (WS20EI) = 'B'
            MOVE 'ECP/RCA'   TO WS40-DTL-CL-TYPE
        ELSE
        IF WS20-ELEC-RCA-OPT (WS20EI) = 'R'
            MOVE 'RCA ONLY'  TO WS40-DTL-CL-TYPE
        ELSE
        IF WS20-ELEC-RCA-OPT (WS20EI) = 'E'
            MOVE 'ECP ONLY'  TO WS40-DTL-CL-TYPE
        ELSE
            MOVE 'N/A'       TO WS40-DTL-CL-TYPE       0
                             WS40-DTL-RCA-STATUS.

IF WS20-ELEC-RCA-OPT (WS20EI) = 'R'
        AND
           WS20-ELEC-RCA-STATUS (WS20EI) = 'C'
            MOVE 'COMPLETE'  TO WS40-DTL-RCA-STATUS.

MOVE 'NO PAPER MATCH FOUND     ' TO WS40-DTL-RESULTS.
        MOVE 'N'                 TO WS10-ALL-MATCHED.
                                  0
        MOVE WS40-DTL-LINE       TO RPT1R-DATA.
        MOVE 2                   TO WS30-LINES.
        PERFORM J000-RPT1-PRINT THRU J000-EXIT.

F020-EXIT. EXIT.

F030-REPORT-MATCH.

MOVE SPACES              TO WS40-DTL-LINE.
```

```
              MOVE WS20-ELEC-CL-SEQ (WS20E1)       0
                                              TO WS40-DTL-E-SEQ.
              MOVE WS20-ELEC-CL-NBR (WS20E1)    TO WS40-DTL-E-ID.
              MOVE WS20-ELEC-ITEM-COUNT (WS20E1) TO WS40-DTL-E-CNT.
              MOVE WS20-ELEC-ITEM-AMOUNT (WS20E1) TO WS40-DTL-E-AMT.

MOVE WS20-PAPER-CL-SEQ (WS20P1)    TO WS40-DTL-P-SEQ.
              MOVE WS20-PAPER-CL-NBR (WS20P1)    TO WS40-DTL-P-ID.
              MOVE WS20-PAPER-ITEM-COUNT (WS20P1) TO WS40-DTL-P-CNT.
              MOVE WS20-PAPER-ITEM-AMOUNT (WS20P1) TO WS40-DTL-P-AMT.
                                          0
              IF WS20-ELEC-RCA-OPT (WS20E1) = 'B'
                 MOVE 'ECP/RCA'   TO WS40-DTL-CL-TYPE
              ELSE
              IF WS20-ELEC-RCA-OPT (WS20E1) = 'R'
                 MOVE 'RCA ONLY'  TO WS40-DTL-CL-TYPE
              ELSE
              IF WS20-ELEC-RCA-OPT (WS20E1) = 'E'
                 MOVE 'ECP ONLY'  TO WS40-DTL-CL-TYPE
              ELSE
                 MOVE 'N/A'       TO WS40-DTL-CL-TYPE
                                  WS40-DTL-RCA-STATUS.      0

IF WS20-ELEC-RCA-OPT (WS20E1) = 'R'
              AND
                 WS20-ELEC-RCA-STATUS (WS20E1) = 'C'
                 MOVE 'COMPLETE'  TO WS40-DTL-RCA-STATUS.

IF WS20-ELEC-MATCHED-ON (WS20E1) = '1'
                 MOVE 'CROSS REFERENCED - 1 TO 1 ' TO WS40-DTL-RESULTS
              ELSE                        0
              IF WS20-ELEC-MATCHED-ON (WS20E1) = 'O'
                 MOVE 'MATCHED ONLINE BY OPERATOR ' TO WS40-DTL-RESULTS
              ELSE
              IF WS20-ELEC-MATCHED-ON (WS20E1) = 'A'
                 MOVE 'CROSS REFERENCED - BY AMT ' TO WS40-DTL-RESULTS
              ELSE
              IF WS20-NBR-OF-ELEC-MATCHES (WS20E1) > ZERO
                 MOVE 'CROSS REFERENCED - BY CNT ' TO WS40-DTL-RESULTS
              ELSE
                 MOVE 'N'         TO WS10-ALL-MATCHED  00
                 MOVE 'NO ELECTRONIC MATCH FOUND ' TO WS40-DTL-RESULTS.

MOVE WS40-DTL-LINE  TO RPT1R-DATA.
              MOVE 2              TO WS30-LINES.
              PERFORM J000-RPT1-PRINT THRU J000-EXIT.

F030-EXIT. EXIT.

F050-MATCHED-ONLINE.
                                       0
              PERFORM F051-SCAN-ONLINE-MATCHES THRU F051-EXIT
```

```
        VARYING WS20P1 FROM 1 BY 1
        UNTIL WS20P1 > WS20-NBR-OF-PAPER-ENTRIES.

F050-EXIT.  EXIT.

F051-SCAN-ONLINE-MATCHES.

IF WS20-PAPER-XREF-SEQ (WS20P1, 1) NOT NUMERIC
        GO TO F051-EXIT.                              0

IF WS20-PAPER-XREF-SEQ (WS20P1, 1) =
        WS20-ELEC-CL-SEQ (WS20E1)
            PERFORM F030-REPORT-MATCH THRU F030-EXIT.

F051-EXIT.  EXIT.

F100-RPT-PAPER.

IF WS20-NBR-OF-PAPER-MATCHES (WS20P1) = ZERO         0
        PERFORM F110-REPORT-NO-ELEC THRU F110-EXIT.

F100-EXIT.  EXIT.

F110-REPORT-NO-ELEC.

MOVE SPACES                TO WS40-DTL-LINE.

MOVE WS20-PAPER-CL-SEQ (WS20P1)    TO WS40-DTL-P-SEQ.
    MOVE WS20-PAPER-CL-NBR (WS20P1)    TO WS40-DTL-P-ID.      0
    MOVE WS20-PAPER-ITEM-COUNT (WS20P1) TO WS40-DTL-P-CNT.
    MOVE WS20-PAPER-ITEM-AMOUNT (WS20P1) TO WS40-DTL-P-AMT.

MOVE 'N/A'       TO WS40-DTL-CL-TYPE
                        WS40-DTL-RCA-STATUS.

MOVE 'NO ELECTRONIC MATCH FOUND ' TO WS40-DTL-RESULTS.
    MOVE 'N'                TO WS10-ALL-MATCHED.

MOVE WS40-DTL-LINE      TO RPT1R-DATA.              0
    MOVE 2           TO WS30-LINES.
    PERFORM J000-RPT1-PRINT THRU J000-EXIT.

F110-EXIT.  EXIT.

F200-RPT-PAPER-CANCELED.

MOVE SPACES                TO WS40-DTL-LINE.

MOVE RR010-KEY          TO WS30-KEY-BREAKDOWN.      0
    MOVE WS30-KEY-CL-SEQ    TO WS40-DTL-P-SEQ.
    MOVE WS30-KEY-CL-NBR    TO WS40-DTL-P-ID.
    MOVE RR010-ACCUM-ITEM-COUNT    TO WS40-DTL-P-CNT.
```

-65-

```
        MOVE RR010-ACCUM-CHECK-AMOUNT TO WS40-DTL-P-AMT.

MOVE 'N/A'         TO WS40-DTL-CL-TYPE
                           WS40-DTL-RCA-STATUS.

MOVE 'CANCELED BY THE OPERATOR  ' TO WS40-DTL-RESULTS.
                                    0
        IF WS20L1 NOT > WS20-LINE-TABLE-MAX
           MOVE WS40-DTL-LINE     TO WS20-DTL-LINE (WS20L1)
           SET WS20L1 UP BY 1.

F200-EXIT. EXIT.

F210-RPT-PAPER-HOLD.

MOVE SPACES             TO WS40-DTL-LINE.
                                 0
        MOVE RR010-KEY          TO WS30-KEY-BREAKDOWN.
        MOVE WS30-KEY-CL-SEQ    TO WS40-DTL-P-SEQ.
        MOVE WS30-KEY-CL-NBR    TO WS40-DTL-P-ID.
        MOVE RR010-ACCUM-ITEM-COUNT   TO WS40-DTL-P-CNT.
        MOVE RR010-ACCUM-CHECK-AMOUNT TO WS40-DTL-P-AMT.

MOVE 'N/A'         TO WS40-DTL-CL-TYPE
                           WS40-DTL-RCA-STATUS.

MOVE 'PLACED ON HOLD BY OPERATOR ' TO WS40-DTL-RESULTS.    0

IF WS20L1 NOT > WS20-LINE-TABLE-MAX
           MOVE WS40-DTL-LINE     TO WS20-DTL-LINE (WS20L1)
           SET WS20L1 UP BY 1.

F210-EXIT. EXIT.

F220-RPT-PAPER-PRIOR-HOLD.

MOVE SPACES             TO WS40-DTL-LINE.   000

MOVE RR010-KEY          TO WS30-KEY-BREAKDOWN.
        MOVE WS30-KEY-CL-SEQ    TO WS40-DTL-P-SEQ.
        MOVE WS30-KEY-CL-NBR    TO WS40-DTL-P-ID.
        MOVE RR010-ACCUM-ITEM-COUNT   TO WS40-DTL-P-CNT.
        MOVE RR010-ACCUM-CHECK-AMOUNT TO WS40-DTL-P-AMT.

MOVE 'N/A'         TO WS40-DTL-CL-TYPE
                           WS40-DTL-RCA-STATUS.
                                     0
        MOVE 'ERROR: PRIOR HOLD PRESENT ' TO WS40-DTL-RESULTS.
        MOVE 'N'               TO WS10-ALL-MATCHED.

IF WS20L1 NOT > WS20-LINE-TABLE-MAX
           MOVE WS40-DTL-LINE     TO WS20-DTL-LINE (WS20L1)
```

```
    SET WS20L1 UP BY 1.

F220-EXIT. EXIT.

F230-RPT-RECON-JUST-PAPER.                          0

MOVE SPACES              TO WS40-DTL-LINE.

MOVE RR010-KEY           TO WS30-KEY-BREAKDOWN.
    MOVE WS30-KEY-CL-SEQ     TO WS40-DTL-P-SEQ.
    MOVE WS30-KEY-CL-NBR     TO WS40-DTL-P-ID.
    MOVE RR010-ACCUM-ITEM-COUNT    TO WS40-DTL-P-CNT.
    MOVE RR010-ACCUM-CHECK-AMOUNT  TO WS40-DTL-P-AMT.

MOVE 'N/A'               TO WS40-DTL-CL-TYPE        0
                                WS40-DTL-RCA-STATUS.

MOVE 'RECON WITH NO-ELECTRONIC   ' TO WS40-DTL-RESULTS.
    MOVE 'N'                 TO WS10-ALL-MATCHED.

IF WS20L1 NOT > WS20-LINE-TABLE-MAX
        MOVE WS40-DTL-LINE   TO WS20-DTL-LINE (WS20L1)
        SET WS20L1 UP BY 1.

F230-EXIT. EXIT.                        0

F240-RPT-PAPER-REJECTED.

MOVE SPACES              TO WS40-DTL-LINE.

MOVE RR010-KEY           TO WS30-KEY-BREAKDOWN.
    MOVE WS30-KEY-CL-SEQ     TO WS40-DTL-P-SEQ.
    MOVE WS30-KEY-CL-NBR     TO WS40-DTL-P-ID.
    MOVE RR010-ACCUM-ITEM-COUNT    TO WS40-DTL-P-CNT.
    MOVE RR010-ACCUM-CHECK-AMOUNT  TO WS40-DTL-P-AMT.        0

MOVE 'N/A'               TO WS40-DTL-CL-TYPE
                                WS40-DTL-RCA-STATUS.

MOVE 'REJECTED IN PAPER FORMATTER' TO WS40-DTL-RESULTS.

IF WS20L1 NOT > WS20-LINE-TABLE-MAX
        MOVE WS40-DTL-LINE   TO WS20-DTL-LINE (WS20L1)
        SET WS20L1 UP BY 1.
                                 0
F240-EXIT. EXIT.

F300-RPT-ELEC-CANCELED.

MOVE SPACES              TO WS40-DTL-LINE.

MOVE RR010-KEY           TO WS30-KEY-BREAKDOWN.
```

-67-

```
        MOVE WS30-KEY-CL-SEQ        TO WS40-DTL-E-SEQ.
        MOVE WS30-KEY-CL-NBR        TO WS40-DTL-E-ID.
        MOVE RR010-ACCUM-ITEM-COUNT    TO WS40-DTL-E-CNT.
        MOVE RR010-ACCUM-CHECK-AMOUNT TO WS40-DTL-E-AMT.

IF RR010-RCA-OPTION = 'B'
           MOVE 'ECP/RCA'     TO WS40-DTL-CL-TYPE
        ELSE
        IF RR010-RCA-OPTION = 'R'
           MOVE 'RCA ONLY'    TO WS40-DTL-CL-TYPE
        ELSE
        IF RR010-RCA-OPTION = 'E'
           MOVE 'ECP ONLY'    TO WS40-DTL-CL-TYPE
        ELSE
           MOVE 'N/A'         TO WS40-DTL-CL-TYPE.

MOVE 'N/A'            TO WS40-DTL-RCA-STATUS.

MOVE 'CANCELED BY THE OPERATOR    ' TO WS40-DTL-RESULTS.

IF WS20L1 NOT > WS20-LINE-TABLE-MAX
           MOVE WS40-DTL-LINE        TO WS20-DTL-LINE (WS20L1)
           SET WS20L1 UP BY 1.

F300-EXIT. EXIT.

F310-RPT-ELEC-HOLD.

MOVE SPACES               TO WS40-DTL-LINE.

MOVE RR010-KEY            TO WS30-KEY-BREAKDOWN.
        MOVE WS30-KEY-CL-SEQ      TO WS40-DTL-E-SEQ.
        MOVE WS30-KEY-CL-NBR      TO WS40-DTL-E-ID.
        MOVE RR010-ACCUM-ITEM-COUNT    TO WS40-DTL-E-CNT.
        MOVE RR010-ACCUM-CHECK-AMOUNT  TO WS40-DTL-E-AMT.

IF RR010-RCA-OPTION = 'B'
           MOVE 'ECP/RCA'     TO WS40-DTL-CL-TYPE
        ELSE
        IF RR010-RCA-OPTION = 'R'
           MOVE 'RCA ONLY'    TO WS40-DTL-CL-TYPE
        ELSE
        IF RR010-RCA-OPTION = 'E'
           MOVE 'ECP ONLY'    TO WS40-DTL-CL-TYPE
        ELSE
           MOVE 'N/A'         TO WS40-DTL-CL-TYPE.

MOVE 'N/A'            TO WS40-DTL-RCA-STATUS.

MOVE 'PLACED ON HOLD BY OPERATOR ' TO WS40-DTL-RESULTS.

IF WS20L1 NOT > WS20-LINE-TABLE-MAX
```

```
        MOVE WS40-DTL-LINE       TO WS20-DTL-LINE (WS20L1)    0
        SET WS20L1 UP BY 1.

F310-EXIT.  EXIT.

F320-RPT-ELEC-PRIOR-HOLD.

MOVE SPACES              TO WS40-DTL-LINE.

MOVE RR010-KEY           TO WS30-KEY-BREAKDOWN.
    MOVE WS30-KEY-CL-SEQ     TO WS40-DTL-E-SEQ.          0
    MOVE WS30-KEY-CL-NBR     TO WS40-DTL-E-ID.
    MOVE RR010-ACCUM-ITEM-COUNT   TO WS40-DTL-E-CNT.
    MOVE RR010-ACCUM-CHECK-AMOUNT TO WS40-DTL-E-AMT.

IF RR010-RCA-OPTION = 'B'
        MOVE 'ECP/RCA'       TO WS40-DTL-CL-TYPE
    ELSE
    IF RR010-RCA-OPTION = 'R'
        MOVE 'RCA ONLY'      TO WS40-DTL-CL-TYPE
    ELSE                                             0
    IF RR010-RCA-OPTION = 'E'
        MOVE 'ECP ONLY'      TO WS40-DTL-CL-TYPE
    ELSE
        MOVE 'N/A'           TO WS40-DTL-CL-TYPE.

MOVE 'N/A'               TO WS40-DTL-RCA-STATUS.

MOVE 'ERROR: PRIOR HOLD PRESENT ' TO WS40-DTL-RESULTS.
    MOVE 'N'                 TO WS10-ALL-MATCHED.
                                  0
    IF WS20L1 NOT > WS20-LINE-TABLE-MAX
        MOVE WS40-DTL-LINE   TO WS20-DTL-LINE (WS20L1)
        SET WS20L1 UP BY 1.

F320-EXIT.  EXIT.

F330-RPT-RECON-NO-PAPER.

MOVE SPACES              TO WS40-DTL-LINE.
                                  0
    MOVE RR010-KEY           TO WS30-KEY-BREAKDOWN.
    MOVE WS30-KEY-CL-SEQ     TO WS40-DTL-E-SEQ.
    MOVE WS30-KEY-CL-NBR     TO WS40-DTL-E-ID.
    MOVE RR010-ACCUM-ITEM-COUNT   TO WS40-DTL-E-CNT.
    MOVE RR010-ACCUM-CHECK-AMOUNT TO WS40-DTL-E-AMT.

IF RR010-RCA-OPTION = 'B'
        MOVE 'ECP/RCA'       TO WS40-DTL-CL-TYPE
    ELSE
    IF RR010-RCA-OPTION = 'R'                        0
        MOVE 'RCA ONLY'      TO WS40-DTL-CL-TYPE
```

```
    ELSE
    IF RR010-RCA-OPTION = 'E'
        MOVE 'ECP ONLY'    TO WS40-DTL-CL-TYPE
    ELSE
        MOVE 'N/A'         TO WS40-DTL-CL-TYPE.

MOVE 'N/A'             TO WS40-DTL-RCA-STATUS.

MOVE 'RECON WITH NO-PAPER    ' TO WS40-DTL-RESULTS.
    MOVE 'N'                       TO WS10-ALL-MATCHED.

IF WS20L1 NOT > WS20-LINE-TABLE-MAX
        MOVE WS40-DTL-LINE    TO WS20-DTL-LINE (WS20L1)
        SET WS20L1 UP BY 1.

F330-EXIT. EXIT.

F340-RPT-ELEC-REJECTED.

MOVE SPACES              TO WS40-DTL-LINE.

MOVE RR010-KEY           TO WS30-KEY-BREAKDOWN.
    MOVE WS30-KEY-CL-SEQ     TO WS40-DTL-E-SEQ.
    MOVE WS30-KEY-CL-NBR     TO WS40-DTL-E-ID.
    MOVE RR010-ACCUM-ITEM-COUNT   TO WS40-DTL-E-CNT.
    MOVE RR010-ACCUM-CHECK-AMOUNT TO WS40-DTL-E-AMT.

IF RR010-RCA-OPTION = 'B'
        MOVE 'ECP/RCA'     TO WS40-DTL-CL-TYPE
    ELSE
    IF RR010-RCA-OPTION = 'R'
        MOVE 'RCA ONLY'    TO WS40-DTL-CL-TYPE
    ELSE
    IF RR010-RCA-OPTION = 'E'
        MOVE 'ECP ONLY'    TO WS40-DTL-CL-TYPE
    ELSE
        MOVE 'N/A'         TO WS40-DTL-CL-TYPE.

MOVE 'N/A'             TO WS40-DTL-RCA-STATUS.

MOVE 'REJECTED IN PREPROCESSOR  ' TO WS40-DTL-RESULTS.

IF WS20L1 NOT > WS20-LINE-TABLE-MAX
        MOVE WS40-DTL-LINE    TO WS20-DTL-LINE (WS20L1)
        SET WS20L1 UP BY 1.

F340-EXIT. EXIT.

F350-RPT-NEXT-DAY-ITEMS.

MOVE SPACES              TO WS40-DTL-LINE.
```

-70-

```
   MOVE RR010-KEY          TO WS30-KEY-BREAKDOWN.
   MOVE WS30-KEY-CL-SEQ      TO WS40-DTL-E-SEQ.
   MOVE WS30-KEY-CL-NBR      TO WS40-DTL-E-ID.
   MOVE RR010-ACCUM-ITEM-COUNT   TO WS40-DTL-E-CNT.
   MOVE RR010-ACCUM-CHECK-AMOUNT TO WS40-DTL-E-AMT.

IF RR010-RCA-OPTION = 'B'
      MOVE 'ECP/RCA'    TO WS40-DTL-CL-TYPE
   ELSE
   IF RR010-RCA-OPTION = 'R'
      MOVE 'RCA ONLY'   TO WS40-DTL-CL-TYPE
   ELSE
   IF RR010-RCA-OPTION = 'E'
      MOVE 'ECP ONLY'   TO WS40-DTL-CL-TYPE
   ELSE
      MOVE 'N/A'        TO WS40-DTL-CL-TYPE.

MOVE 'N/A'           TO WS40-DTL-RCA-STATUS.

MOVE '*** NEXT DAY CASH LETTER  ' TO WS40-DTL-RESULTS.

IF WS20L1 NOT > WS20-LINE-TABLE-MAX
      MOVE WS40-DTL-LINE       TO WS20-DTL-LINE (WS20L1)
      SET WS20L1 UP BY 1.

F350-EXIT. EXIT.

F500-RPT-LINES.                               0

MOVE WS20-DTL-LINE (WS20L1) TO RPT1R-DATA.
      MOVE 2              TO WS30-LINES.
      PERFORM J000-RPT1-PRINT THRU J000-EXIT.

F500-EXIT. EXIT.

EJECT
   G000-UPDATE-PAPER-RCF.
                                       0
      MOVE WS20-PAPER-KEY (WS20P1)    TO RCF-FD-KEY.

PERFORM R320-RDM-READ-RCF-RXF THRU R320-EXIT.

MOVE WS20-ELEC-CL-SEQ (WS20E1)    TO RR010-RECON-TO-CL-SEQ.
      MOVE WS20-ELEC-CL-NBR (WS20E1)    TO RR010-RECON-TO-CL-NUM.
      MOVE WS20-ELEC-RCA-OPT (WS20E1)   TO RR010-RCA-OPTION.
      MOVE WS20-ELEC-RCA-STATUS (WS20E1) TO RR010-RCA-STATUS.
      MOVE 'S'                TO RR010-RECONCILIATION-ACTION.
                                       0
      PERFORM R330-REWRITE-RCF THRU R330-EXIT.

G000-EXIT. EXIT.
```

```
G100-UPDATE-ELEC-RCF.

MOVE WS20-ELEC-KEY (WS20E1)    TO RCF-FD-KEY.

PERFORM R320-RDM-READ-RCF-RXF THRU R320-EXIT.

SET RR010R1 TO 1.
    PERFORM G110-FILL-IN-XREF-TABLE THRU G110-EXIT
      VARYING WS20EM1 FROM 1 BY 1
      UNTIL WS20EM1 > WS20-NBR-OF-ELEC-MATCHES (WS20E1).

MOVE WS20-ELEC-RCA-STATUS (WS20E1) TO RR010-RCA-STATUS.
    MOVE 'S'                 TO RR010-RECONCILIATION-ACTION.

PERFORM R330-REWRITE-RCF THRU R330-EXIT.

G100-EXIT. EXIT.

G110-FILL-IN-XREF-TABLE.

MOVE WS20-ELEC-XREF-SEQ (WS20E1, WS20EM1)
      TO RR010-RECON-PAPER-SEQ (RR010R1).

SET RR010R1 UP BY 1.

G110-EXIT. EXIT.

EJECT

*   PRINT REPORT 1 LINE

J000-RPT1-PRINT.

ADD WS30-LINES          TO WS90-LINE-COUNT.

IF WS90-LINE-COUNT GREATER THAN UW110-RPT-LINES-PER-PAGE
      MOVE RPT1R-REC          TO WS30-SAVE-REC
      PERFORM J100-RPT1-TITLES THRU J100-EXIT
      MOVE WS30-SAVE-REC      TO RPT1R-REC.

PERFORM R100-WRITE-RPT-1 THRU R100-EXIT.

J000-EXIT. EXIT.

*   PRINT REPORT 1 HEADINGS

J100-RPT1-TITLES.

ADD 1               TO WS90-PAGE-COUNT.

MOVE WS40-TITLE-1       TO RPT1R-DATA.
```

```
    MOVE 0              TO WS30-LINES.
    PERFORM R100-WRITE-RPT-1 THRU R100-EXIT.

MOVE WS90-PAGE-COUNT    TO WS40-T2-PAGE-NBR.
    MOVE WS40-TITLE-2       TO RPT1R-DATA.
    MOVE 1              TO WS30-LINES.
    PERFORM R100-WRITE-RPT-1 THRU R100-EXIT.

MOVE WS40-TITLE-3       TO RPT1R-DATA.
    MOVE 2              TO WS30-LINES.
    PERFORM R100-WRITE-RPT-1 THRU R100-EXIT.

MOVE CR010-BANK-ID      TO WS40-T4-PARTNER-RT
    MOVE CR010-ENDPOINT-NAME    TO WS40-T4-PARTNER-NAME.

MOVE WS40-TITLE-4       TO RPT1R-DATA.
    MOVE 2              TO WS30-LINES.
    PERFORM R100-WRITE-RPT-1 THRU R100-EXIT.

MOVE CR010-RCA-VAR-AMOUNT   TO WS40-T5-VAR-AMT.
    MOVE CR010-RCA-ITEM-VAR-PCT TO WS40-T5-VAR-PCT.

MOVE WS40-TITLE-5       TO RPT1R-DATA.
    MOVE 2              TO WS30-LINES.
    PERFORM R100-WRITE-RPT-1 THRU R100-EXIT.

MOVE WS40-DTL-TITLE-1   TO RPT1R-DATA.
    MOVE 3              TO WS30-LINES.
    PERFORM R100-WRITE-RPT-1 THRU R100-EXIT.

MOVE WS40-DTL-TITLE-2   TO RPT1R-DATA.
    MOVE 1              TO WS30-LINES.
    PERFORM R100-WRITE-RPT-1 THRU R100-EXIT.

MOVE WS40-DTL-TITLE-3   TO RPT1R-DATA.
    MOVE 1              TO WS30-LINES.
    PERFORM R100-WRITE-RPT-1 THRU R100-EXIT.

MOVE 8              TO WS90-LINE-COUNT.
    MOVE 2              TO WS30-LINES.

J100-EXIT. EXIT.

J900-END-OF-REPORT.

MOVE 3              TO WS30-LINES.
    MOVE WS40-END-OF-REPORT TO RPT1R-DATA.
    PERFORM J000-RPT1-PRINT THRU J000-EXIT.

J900-EXIT. EXIT.

EJECT
```

* FILE OPEN ERROR

M000-OPEN-ERROR.

MOVE STATW-FILE-STATUS    TO UL700-F0001-FILE-STATUS.
    MOVE 01    TO UL700-MSG-ID-COUNT.
    MOVE 'F0001'    TO UL700-MSG-ID (1).

PERFORM M900-CALL-MESSAGE-ROUTINE THRU M900-EXIT.

IF UL700-SUCCESSFUL
      DISPLAY 'CHKR5539 - ' UL700-RTN-MSG (1).

MOVE UW004-2001    TO WS30-RETURN-CODE.

GO TO X999-RETURN.

M000-EXIT. EXIT.

* FILE I/O ERROR

M010-I-O-ERROR.

MOVE STATW-FILE-STATUS    TO UL700-F0001-FILE-STATUS.
    MOVE 01    TO UL700-MSG-ID-COUNT.
    MOVE 'F0001'    TO UL700-MSG-ID (1).

PERFORM M900-CALL-MESSAGE-ROUTINE THRU M900-EXIT.

IF UL700-SUCCESSFUL
      DISPLAY 'CHKR5539 - ' UL700-RTN-MSG (1).

MOVE UW004-2002    TO WS30-RETURN-CODE.

M010-EXIT. EXIT.

* FILE CLOSE ERROR

M020-CLOSE-ERROR.

MOVE STATW-FILE-STATUS    TO UL700-F0001-FILE-STATUS.
    MOVE 01    TO UL700-MSG-ID-COUNT.
    MOVE 'F0001'    TO UL700-MSG-ID (1).
*
*** CALL THE MESSAGE ROUTINE.
*** THIS PARAGRAPH DOES NOT PERFORM M900-CALL-MESSAGE-ROUTINE
*** SINCE THIS MIGHT RESULT IN A ENDLESS LOOP.
*

```
        CALL 'CHKU5700'  USING  UL700-LINKAGE-AREA.

IF UL700-SUCCESSFUL
        DISPLAY 'CHKR5539 - ' UL700-RTN-MSG (1).

MOVE UW004-2003         TO WS30-RETURN-CODE.

M020-EXIT. EXIT.

0
 *  CONTROL DATA FILE EMPTY ERROR

M030-EMPTY-RCF.

MOVE SPACES            TO UL700-LINKAGE-AREA.
     MOVE 01                TO UL700-MSG-ID-COUNT.
     MOVE 'M0039'           TO UL700-MSG-ID (1).

PERFORM M900-CALL-MESSAGE-ROUTINE THRU M900-EXIT.
                                      0
     IF UL700-SUCCESSFUL
        DISPLAY 'CHKR5539 - ' UL700-RTN-MSG (1).

MOVE UW004-2004         TO WS30-RETURN-CODE.

M030-EXIT. EXIT.

*   CALL THE MESSAGE ROUTINE
 0
 M900-CALL-MESSAGE-ROUTINE.

MOVE SPACES            TO UL700-RTN-CODE.

CALL 'CHKU5700'  USING  UL700-LINKAGE-AREA.

IF UL700-SUCCESSFUL
        NEXT SENTENCE
     ELSE
        MOVE UW004-2005      TO WS30-RETURN-CODE       0
        IF UL700-INVALID-CALL
 ***       *THE REASON THE CALL WAS INVALID WILL BE SENT BACK
 ***       *BY THE MESSAGE ROUTINE IN UL700-RTN-MSG (1).
           DISPLAY 'CHKR5539 - ' UL700-RTN-MSG (1)
           GO TO X999-RETURN
        ELSE
        IF UL700-CALL-FAILED
 ***       *MESSAGE ROUTINE WAS NOT EXECUTED
           DISPLAY 'CHKR5539 - CALL TO CHKU5700 FAILED'
           GO TO X999-RETURN.                  0

M900-EXIT. EXIT.
```

EJECT

* PARM FILE INPUT ROUTINE

R000-SEQ-READ-PARM-FILE.

```
    MOVE 'SEQ READ'         TO UL700-F0001-FILE-ACTION.
    MOVE 'INPUT'            TO UL700-F0001-FILE-ACCESS.
    MOVE UW003-CHKS303-DDNAME    TO UL700-F0001-FILE-DDNAME.

READ PARM-FILE INTO RR303-PARM-REC.

IF END-OF-FILE
       GO TO R000-EXIT.

IF NOT SUCCESSFUL
       PERFORM M010-I-O-ERROR THRU M010-EXIT
       GO TO X999-RETURN.

R000-EXIT. EXIT.
```

EJECT

* REPORT 1 OUTPUT ROUTINE

R100-WRITE-RPT-1.

```
    MOVE 'WRITE'            TO UL700-F0001-FILE-ACTION.
    MOVE 'OUTPUT'           TO UL700-F0001-FILE-ACCESS.
    MOVE UW003-JDCRPT1-DDNAME    TO UL700-F0001-FILE-DDNAME.
    MOVE SPACES             TO RPT1R-CC.

IF WS30-LINES = ZEROS
       WRITE RPT1-REC FROM RPT1R-REC
         AFTER ADVANCING PAGE
    ELSE
       WRITE RPT1-REC FROM RPT1R-REC
         AFTER ADVANCING WS30-LINES.

IF NOT SUCCESSFUL
       PERFORM M010-I-O-ERROR THRU M010-EXIT
       GO TO X999-RETURN.

R100-EXIT. EXIT.
```

EJECT

* CIF FILE INPUT ROUTINE

R200-RDM-READ-CIF.

```
        MOVE 'RDM READ'          TO UL700-F0001-FILE-ACTION.
        MOVE 'INPUT'             TO UL700-F0001-FILE-ACCESS.
        MOVE UW003-CHKC010-DDNAME    TO UL700-F0001-FILE-DDNAME.

READ CIF-FILE INTO CR010-CIF-RECORD.
                                    0
        IF NOT-FOUND
          GO TO R200-EXIT.

IF NOT SUCCESSFUL
          PERFORM M010-I-O-ERROR THRU M010-EXIT
          GO TO X999-RETURN.

IF CR010-SITE-REC
          MOVE CR010-CIF-RECORD TO CR010-SITE-RECORD
        ELSE                             0
        IF CR010-BANK-REC
          MOVE CR010-CIF-RECORD TO CR010-PARTNER-BANK-RECORD.

R200-EXIT. EXIT.

EJECT

*   RCF AND RXF FILE I/O ROUTINES

R300-START-RCF.                      0

MOVE 'START'             TO UL700-F0001-FILE-ACTION.
        MOVE 'INPUT'             TO UL700-F0001-FILE-ACCESS.
        MOVE UW003-CHKR010-DDNAME    TO UL700-F0001-FILE-DDNAME.

IF WS20-HOLD-START-KEY = SPACES
          MOVE WS20-KEY          TO RR010-C-KEY
        ELSE
          MOVE WS20-HOLD-START-KEY TO RR010-C-KEY.
                                    0
        MOVE RR010-C-KEY         TO RCF-FD-KEY.

START RECEIVE-CONTROL-FILE
          KEY IS NOT < RCF-FD-KEY.

IF NOT-FOUND
          GO TO R300-EXIT.

IF NOT SUCCESSFUL
          PERFORM M010-I-O-ERROR THRU M010-EXIT         0
          GO TO X999-RETURN.

R300-EXIT. EXIT.

R310-SEQ-READ-RCF-RXF.
```

```
        MOVE 'SEQ READ'           TO UL700-F0001-FILE-ACTION.
        MOVE 'INPUT'              TO UL700-F0001-FILE-ACCESS.
        MOVE UW003-CHKR010-DDNAME    TO UL700-F0001-FILE-DDNAME.
                                        0
        READ RECEIVE-CONTROL-FILE NEXT INTO RR010-RECORD-AREA.

MOVE RR010-C-KEY          TO WS20-HOLD-START-KEY.

IF END-OF-FILE
           GO TO R310-EXIT.

IF NOT SUCCESSFUL
           PERFORM M010-I-O-ERROR THRU M010-EXIT
           GO TO X999-RETURN.              0

*
   *** BYPASS A RECORD FOR THE WRONG DATE
   *
        IF RR010-C-KEY-PROCESS-DATE NOT = WS20-KEY-PROCESS-DATE
           GO TO R310-EXIT.

*
   *** IGNORE ANY RECORD THAT IS NOT AN ELECTRONIC OR PAPER
   *** CASH LETTER.
   *                                     0
        IF RR010-C-CASH-LETTER
           OR
           RR010-C-PAPER-LETTER
              MOVE RR010-RECORD-AREA TO RR010-RCF-RECORD
        ELSE
           GO TO R310-SEQ-READ-RCF-RXF.

MOVE 'N'    TO WS20-ONLINE-XREF.
   *                                     0
   *** READ CORRESPONDING RXF
   *
        MOVE UW003-CHKR110-DDNAME    TO UL700-F0001-FILE-DDNAME.

MOVE RCF-FD-KEY           TO RXF-FD-KEY.

READ RECEIVE-EXCEPTION-FILE INTO RR110-RXF-RECORD.

IF NOT-FOUND                     00
           GO TO R310-FINISH-UP.

IF NOT SUCCESSFUL
           PERFORM M010-I-O-ERROR THRU M010-EXIT
           GO TO X999-RETURN.

*
   *** COMPARE THE RCF AND RXF MOD DATES TO FIND THE MOST
```

-78-

```
*** CURRENT RECORD.  IF THE RXF IS MORE CURRENT, THEN
*** MOVE IT TO THE RCF RECORD AREA.                         0
*
   IF RR010-MOD-DATE-N = RR110-MOD-DATE-N
      IF RR110-MOD-TIME-N > RR010-MOD-TIME-N
         MOVE RR110-RXF-RECORD TO RR010-RCF-RECORD
                     RR010-RECORD-AREA
      ELSE
         GO TO R310-FINISH-UP
   ELSE
   IF RR010-MOD-YEAR = RR110-MOD-YEAR
      IF RR110-MOD-DATE-N > RR010-MOD-DATE-N                0
         MOVE RR110-RXF-RECORD TO RR010-RCF-RECORD
                     RR010-RECORD-AREA
      ELSE
         GO TO R310-FINISH-UP
   ELSE
      MOVE RR110-MOD-DATE-N    TO UW001-DATE-N
      MOVE UW001-YEAR        TO UW001-GREG-YEAR
      MOVE UW001-MONTH       TO UW001-GREG-MONTH
      MOVE UW001-DAY         TO UW001-GREG-DAY
      MOVE UW001-GREG-DATE-X   TO DATEL-MDY-1              0
      MOVE RR010-MOD-DATE-N    TO UW001-DATE-N
      MOVE UW001-YEAR        TO UW001-GREG-YEAR
      MOVE UW001-MONTH       TO UW001-GREG-MONTH
      MOVE UW001-DAY         TO UW001-GREG-DAY
      MOVE UW001-GREG-DATE-X   TO DATEL-MDY-2
      MOVE HIGH-VALUES       TO DATEL-RTN-CODE
      MOVE 'DD'              TO DATEL-COMMAND
      PERFORM U000-CALL-DATE-ROUTINE THRU U000-EXIT
      IF DATEL-SUCCESS
         AND                                               0
         DATEL-DDAYS < ZERO
            MOVE RR110-RXF-RECORD TO RR010-RCF-RECORD
                        RR010-RECORD-AREA.

R310-FINISH-UP.

IF WS20-KEY-PTNR-RTABA = LOW-VALUES
         MOVE RR010-KEY-ORIG-PTNR-RTABA TO WS20-KEY-PTNR-RTABA
         PERFORM C210-READ-PARTNER-CIF THRU C210-EXIT
      ELSE                                                 0
      IF RR010-KEY-ORIG-PTNR-RTABA NOT = WS20-KEY-PTNR-RTABA
         MOVE RR010-KEY-ORIG-PTNR-RTABA TO WS20-KEY-PTNR-RTABA
         MOVE 'Y'              TO WS10-RCF-NEW-PARTNER
         GO TO R310-EXIT.

IF RR010-PAPER-LETTER
         IF RR010-LETTER-CANCELED
            PERFORM F200-RPT-PAPER-CANCELED THRU F200-EXIT
         ELSE
         IF RR010-PLACED-ONHOLD-TODAY                      0
```

```
              PERFORM F210-RPT-PAPER-HOLD THRU F210-EXIT
           ELSE
           IF RR010-PRIOR-DAY-HOLD
              PERFORM F220-RPT-PAPER-PRIOR-HOLD THRU F220-EXIT
           ELSE
           IF RR010-RECONCIL-JUST-PAPER
              PERFORM F230-RPT-RECON-JUST-PAPER THRU F230-EXIT
           ELSE
           IF RR010-EDIT-REJECTED
              PERFORM F240-RPT-PAPER-REJECTED THRU F240-EXIT      0
           ELSE
              NEXT SENTENCE
         ELSE
         IF RR010-CASH-LETTER
            IF RR010-LETTER-CANCELED
               PERFORM F300-RPT-ELEC-CANCELED THRU F300-EXIT
            ELSE
C21028      IF RR010-CL-PROC-DATEERR-TODAY
C21028         PERFORM F350-RPT-NEXT-DAY-ITEMS THRU F350-EXIT
C21028      ELSE
            IF RR010-PLACED-ONHOLD-TODAY
               PERFORM F310-RPT-ELEC-HOLD THRU F310-EXIT
            ELSE                                 0
            IF RR010-PRIOR-DAY-HOLD
               PERFORM F320-RPT-ELEC-PRIOR-HOLD THRU F320-EXIT
            ELSE
            IF RR010-RECONCIL-WITH-NO-PAPR
               PERFORM F330-RPT-RECON-NO-PAPER THRU F330-EXIT
            ELSE
            IF RR010-EDIT-REJECTED
               PERFORM F340-RPT-ELEC-REJECTED THRU F340-EXIT.

IF RR010-LETTER-CANCELED                     0
           OR
           RR010-EDIT-REJECTED
           OR
C21028     RR010-CL-PROC-DATEERR-TODAY
C21028     OR
           RR010-PLACED-ONHOLD-TODAY
           OR
           RR010-PRIOR-DAY-HOLD
           OR
           RR010-RECONCIL-JUST-PAPER
           OR
           RR010-RECONCIL-WITH-NO-PAPR                  00
              GO TO R310-SEQ-READ-RCF-RXF.

*
      *** ELECTRONIC LETTER ALREADY TIED TO A PAPER LETTER.
      *
       IF RR010-CASH-LETTER
          AND
```

```
        RR010-RECON-PAPER-SEQ (1) NOT = ZEROES
          MOVE 'Y' TO WS20-ONLINE-XREF.
*                                              ()
*
*** PAPER LETTER ALREADY TIED TO AN ELECTRONIC LETTER.
*
   IF RR010-PAPER-LETTER
     AND
     RR010-RECON-TO-CL-SEQ NOT = ZEROES
       MOVE 'Y' TO WS20-ONLINE-XREF.

R310-EXIT. EXIT.
                                               0
R320-RDM-READ-RCF-RXF.

MOVE 'RDM READ'         TO UL700-F0001-FILE-ACTION.
   MOVE 'INPUT'            TO UL700-F0001-FILE-ACCESS.
   MOVE UW003-CHKR010-DDNAME    TO UL700-F0001-FILE-DDNAME.

READ RECEIVE-CONTROL-FILE INTO RR010-RCF-RECORD.

MOVE RR010-RCF-RECORD      TO RR010-RECORD-AREA.
                                   ()
   IF NOT SUCCESSFUL
     PERFORM M010-I-O-ERROR THRU M010-EXIT
     GO TO X999-RETURN.

*
*** READ CORRESPONDING RXF
*
   MOVE UW003-CHKR110-DDNAME    TO UL700-F0001-FILE-DDNAME.

MOVE RCF-FD-KEY         TO RXF-FD-KEY.         0

READ RECEIVE-EXCEPTION-FILE INTO RR110-RXF-RECORD.

IF NOT-FOUND
     GO TO R320-EXIT.

IF NOT SUCCESSFUL
     PERFORM M010-I-O-ERROR THRU M010-EXIT
     GO TO X999-RETURN.
                                               ()
*
*** COMPARE THE RCF AND RXF MOD DATES TO FIND THE MOST
*** CURRENT RECORD. IF THE RXF IS MORE CURRENT, THEN
*** MOVE IT TO THE RCF RECORD AREA.
*
   IF RR010-MOD-DATE-N = RR110-MOD-DATE-N
     IF RR110-MOD-TIME-N > RR010-MOD-TIME-N
       MOVE RR110-RXF-RECORD TO RR010-RCF-RECORD
                   RR010-RECORD-AREA
```

-81-

```
        ELSE                          0
           GO TO R320-EXIT
        ELSE
        IF RR010-MOD-YEAR = RR110-MOD-YEAR
           IF RR110-MOD-DATE-N > RR010-MOD-DATE-N
              MOVE RR110-RXF-RECORD TO RR010-RCF-RECORD
                         RR010-RECORD-AREA
           ELSE
              GO TO R320-EXIT
        ELSE
           MOVE RR110-MOD-DATE-N    TO UW001-DATE-N        0
           MOVE UW001-YEAR       TO UW001-GREG-YEAR
           MOVE UW001-MONTH      TO UW001-GREG-MONTH
           MOVE UW001-DAY        TO UW001-GREG-DAY
           MOVE UW001-GREG-DATE-X   TO DATEL-MDY-1
           MOVE RR010-MOD-DATE-N    TO UW001-DATE-N
           MOVE UW001-YEAR       TO UW001-GREG-YEAR
           MOVE UW001-MONTH      TO UW001-GREG-MONTH
           MOVE UW001-DAY        TO UW001-GREG-DAY
           MOVE UW001-GREG-DATE-X   TO DATEL-MDY-2
           MOVE HIGH-VALUES      TO DATEL-RTN-CODE          0
           MOVE 'DD'             TO DATEL-COMMAND
           PERFORM U000-CALL-DATE-ROUTINE THRU U000-EXIT
           IF DATEL-SUCCESS
              AND
              DATEL-DDAYS < ZERO
                 MOVE RR110-RXF-RECORD TO RR010-RCF-RECORD
                            RR010-RECORD-AREA.

R320-EXIT. EXIT.
                                    0
   R330-REWRITE-RCF.

MOVE 'REWRITE'          TO UL700-F0001-FILE-ACTION.
      MOVE 'I/O'              TO UL700-F0001-FILE-ACCESS.
      MOVE UW003-CHKR010-DDNAME     TO UL700-F0001-FILE-DDNAME.

MOVE WS30-CURR-DATE     TO RR010-MOD-DATE.
      MOVE WS30-CURR-TIME     TO RR010-MOD-TIME.

REWRITE RCF-FD-REC FROM RR010-RCF-RECORD.            00

IF NOT SUCCESSFUL
         PERFORM M010-I-O-ERROR THRU M010-EXIT
         GO TO X999-RETURN.

R330-EXIT. EXIT.

EJECT

*  CXF FILE I/O ROUTINES                  0
```

```
R400-RDM-READ-CXF.

MOVE 'RDM READ'          TO UL700-F0001-FILE-ACTION.
    MOVE 'I/O'               TO UL700-F0001-FILE-ACCESS.
    MOVE UW003-CHKC110-DDNAME    TO UL700-F0001-FILE-DDNAME.

READ CXF-FILE INTO CR110-CIF-EXCP-RECORD.

IF NOT-FOUND
       GO TO R400-EXIT.

IF NOT SUCCESSFUL
       PERFORM M010-I-O-ERROR THRU M010-EXIT
       GO TO X999-RETURN.

R400-EXIT. EXIT.

EJECT
0
*   DATE CONVERSION

U000-CALL-DATE-ROUTINE.

CALL 'JDCDATEB' USING DATEL-LINKAGE-AREA.

U000-EXIT. EXIT.

EJECT
0
*   END PROCESSING

X999-RETURN.

IF UW004-2001 NOT = WS30-RETURN-CODE
       PERFORM J900-END-OF-REPORT THRU J900-EXIT.

PERFORM A200-CLOSE-FILES THRU A200-EXIT.

0
*
*** SEND OUT A WARNING THAT SOME CASH LETTERS WERE NOT MATCHED.
*** THIS MAY BE OK DEPENDING ON THE SITUATION.
*
    IF WS30-RETURN-CODE = ZERO
       AND
       WS10-ALL-MATCHED = 'N'
         MOVE 0004 TO WS30-RETURN-CODE.

DISPLAY 'CHKR5539 - RETURN-CODE = ' WS30-RETURN-CODE.     0

DISPLAY 'CHKR5539 - END'.
```

```
            MOVE WS30-RETURN-CODE     TO RETURN-CODE.

GOBACK.

C21013*
C21013***  JDCA TEXT CENTERING LOGIC - PROCEDURE DIVISION COPYBOOK
C21013*
C21013    COPY JDCCNTRP.

******************  END OF PROGRAM CHKR5539
```

What is claimed is:

1. A reconciling circuit for use in electronic check processing for reconciling a first database with a second database, said first database containing first item data arranged in records and fields, said second database containing second item data arranged in records and fields, said reconciling circuit comprising:

a matching circuit for comparing said records of said first database with said records of said second database, said matching circuit placing a designation on mismatching ones of said records of said first and second databases;

at least one field mismatch tolerance rule indicating, by field, an allowed extent of mismatch; and a mismatch tolerance circuit for applying said at least one field mismatch tolerance rule to said fields of said mismatching ones, said mismatch tolerance circuit removing said designation when said fields of said mismatching ones fall within said mismatch tolerance rules.

2. The circuit as recited in claim 1 wherein said first database is a database of predetermined presentment information relating to negotiable instruments sent from a presenting financial institution (FI) to a receiving FI and said second database is a database of information captured from said negotiable instruments at said receiving FI.

3. The circuit as recited in claim 1 wherein said fields include fields of a magnetic ink character recognition (MICR) line on a negotiable instrument.

4. The circuit as recited in claim 1 wherein each of said records corresponds to a single negotiable instrument sent from a presenting financial institution (FI) to a receiving FI.

5. The circuit as recited in claim 1 wherein each of said records corresponds to a bundle of negotiable instruments sent from a presenting financial institution (FI) to a receiving FI.

6. The circuit as recited in claim 1 wherein said at least one field mismatch tolerance rule is a rule concerning an allowed number of character deviations in said fields.

7. The circuit as recited in claim 1 wherein said at least one field mismatch tolerance rule is a rule concerning an allowed substitution of characters in said fields.

8. The circuit as recited in claim 1 wherein said at least one field mismatch tolerance rule is a rule concerning a pattern of adjoining records of said first and second databases.

9. The circuit as recited in claim 1 wherein said at least one field mismatch tolerance rule adapts over time as a function of said first and second item data.

10. The circuit as recited in claim 1 wherein said second database is a database of information captured from negotiable instruments at a receiving financial institution (FI) by a magnetic ink character recognition (MICR) reader, said mismatch tolerance circuit employable to diagnose an operation of said MICR reader.

11. A method of operation for controlling an electronic check processing system for reconciling a first database with a second database, said first database containing first item data arranged in records and fields, said second database containing second item data arranged in records and fields, said method comprising the steps of:

establishing at least one field mismatch tolerance rule indicating, by field, an allowed extent of mismatch;

comparing said records of said first database with said records of said second database;

placing a designation on mismatching ones of said records of said first and second databases;

applying said at least one field mismatch tolerance rule to said fields of said mismatching ones; and removing said designation when said fields of said mismatching ones fall within said mismatch tolerance rules.

12. The method as recited in claim 11 wherein said first database is a database of predetermined presentment information relating to negotiable instruments sent from a presenting financial institution (FI) to a receiving FI and said second database is a database of information captured from said negotiable instruments at said receiving FI.

13. The method as recited in claim 11 wherein said fields include fields of a magnetic ink character recognition (MICR) line on a negotiable instrument.

14. The method as recited in claim 11 wherein each of said records corresponds to a single negotiable instrument sent from a presenting financial institution (FI) to a receiving FI.

15. The method as recited in claim 11 wherein each of said records corresponds to a bundle of negotiable instruments sent from a presenting financial institution (FI) to a receiving FI.

16. The method as recited in claim 11 wherein said at least one field mismatch tolerance rule is a rule concerning an allowed number of character deviations in said fields.

17. The method as recited in claim 11 wherein said at least one field mismatch tolerance rule is a rule concerning an allowed substitution of characters in said fields.

18. The method as recited in claim 11 wherein said at least one field mismatch tolerance rule is a rule concerning a pattern of adjoining records of said first and second databases.

19. The method as recited in claim 11 further comprising the step of adapting said at least one field mismatch tolerance rule over time as a function of said first and second item data.

20. The method as recited in claim 11 further comprising the step of capturing said second database from negotiable instruments at a receiving financial institution (FI) by a magnetic ink character recognition (MICR) reader, said mismatch tolerance circuit employable to diagnose an operation of said MICR reader.

21. A network of processing systems, including a presenting financial institution (FI) processing system and a receiving FI processing system, for reconciling a first database with a second database, said first database containing first item data arranged in records and fields, said second database containing second item data arranged in records and fields, said network comprising:

a matching circuit for comparing said records of said first database with said records of said second database, said matching circuit placing a designation on mismatching ones of said records of said first and second databases;

at least one field mismatch tolerance rule indicating, by field, an allowed extent of mismatch; and a mismatch tolerance circuit for applying said at least one field mismatch tolerance rule to said fields of said mismatching ones, said mismatch tolerance circuit removing said designation when said fields of said mismatching ones fall within said mismatch tolerance rules.

22. The system as recited in claim 21 wherein said first database is a database of predetermined presentment information relating to negotiable instruments sent from a presenting financial institution (FI) to a receiving FI and said second database is a database of information captured from said negotiable instruments at said receiving FI.

23. The system as recited in claim 21 wherein said fields include fields of a magnetic ink character recognition (MICR) line on a negotiable instrument.

24. The system as recited in claim 21 wherein each of said records corresponds to a single negotiable instrument sent from a presenting financial institution (FI) to a receiving FI.

25. The system as recited in claim 21 wherein each of said records corresponds to a bundle of negotiable instruments sent from a presenting financial institution (FI) to a receiving FI.

26. The system as recited in claim 21 wherein said at least one field mismatch tolerance rule is a rule concerning an allowed number of character deviations in said fields.

27. The system as recited in claim 21 wherein said at least one field mismatch tolerance rule is a rule concerning an allowed substitution of characters in said fields.

28. The system as recited in claim 21 wherein said at least one field mismatch tolerance rule is a rule concerning a pattern of adjoining records of said first and second databases.

29. The system as recited in claim 21 wherein said at least one field mismatch tolerance rule adapts over time as a function of said first and second item data.

30. The system as recited in claim 21 wherein said second database is a database of information captured from negotiable instruments at a receiving financial institution (FI) by a magnetic ink character recognition (MICR) reader, said mismatch tolerance circuit employable to diagnose an operation of said MICR reader.

* * * * *

UNITED STATES PATENT AND TRADEMARK OFFICE
CERTIFICATE OF CORRECTION

PATENT NO. : 5,689,579
DATED : November 18, 1997
INVENTOR(S) : Stanley M. Josephson It is certified that error appears in the above-indentified patent and that said Letters Patent is hereby corrected as shown below:

Col. 1, line 35, "dam" should be --data--;

Col. 1, line 54, "derailed" should be --detailed--;

Col. 4, line 3, "dam" should be --data--;

Col. 11, line 25 "dram" should be --drawn--; and

Col. 12, line 39, please insert --5-- before digits

Signed and Sealed this

Third Day of February, 1998

BRUCE LEHMAN

*Attest:*

*Attesting Officer*   *Commissioner of Patents and Trademarks*